United States Patent
Ueda et al.

(10) Patent No.: US 9,292,286 B2
(45) Date of Patent: Mar. 22, 2016

(54) SHUFFLE PATTERN GENERATING CIRCUIT, PROCESSOR, SHUFFLE PATTERN GENERATING METHOD, AND INSTRUCTION SEQUENCE

(75) Inventors: Kyoko Ueda, Osaka (JP); Daisuke Baba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 432 days.

(21) Appl. No.: 13/822,213

(22) PCT Filed: Sep. 13, 2012

(86) PCT No.: PCT/JP2012/005819
§ 371 (c)(1),
(2), (4) Date: Mar. 11, 2013

(87) PCT Pub. No.: WO2013/057872
PCT Pub. Date: Apr. 25, 2013

(65) Prior Publication Data
US 2013/0275718 A1    Oct. 17, 2013

(30) Foreign Application Priority Data
Oct. 18, 2011 (JP) .................. 2011-228892

(51) Int. Cl.
*G06F 9/30* (2006.01)
*G06F 7/76* (2006.01)

(52) U.S. Cl.
CPC ............ *G06F 9/30032* (2013.01); *G06F 7/766* (2013.01); *G06F 9/30018* (2013.01)

(58) Field of Classification Search
None
See application file for complete search history.

(56) References Cited

U.S. PATENT DOCUMENTS

| 4,445,177 | A | * | 4/1984 | Bratt | .................. G06F 8/41 712/245 |
| 6,304,991 | B1 | * | 10/2001 | Rowitch | .............. H03M 13/271 714/755 |
| 2002/0035678 | A1 | | 3/2002 | Rice et al. | |
| 2003/0131030 | A1 | | 7/2003 | Sebot et al. | |
| 2004/0193850 | A1 | | 9/2004 | Lee et al. | |
| 2005/0125624 | A1 | | 6/2005 | Rose et al. | |
| 2005/0172106 | A1 | | 8/2005 | Ford et al. | |

FOREIGN PATENT DOCUMENTS

| CN | 1914592 A | 2/2007 |
| CN | 101061460 A | 10/2007 |

(Continued)

OTHER PUBLICATIONS

International Search Report issued Nov. 27, 2012 in corresponding International Application No. PCT/JP2012/005819.

(Continued)

*Primary Examiner* — William B Partridge
(74) *Attorney, Agent, or Firm* — Wenderoth, Lind & Ponack, L.L.P.

(57) ABSTRACT

Based on an input index sequence (702) composed of four indices (each having a bit width of 8 bits), a shift-copier generates an index sequence (902) by shifting each index leftward by 1 bit and making two copies of each index, and outputs the generated index sequence (902). An adder generates a shuffle pattern (703) by adding 1, 0, 1, 0, 1, 0, 1 and 0 to the indices in the index sequence (902) from left to right, and outputs the generated shuffle pattern (703).

12 Claims, 23 Drawing Sheets

(56) References Cited

FOREIGN PATENT DOCUMENTS

| | | |
|---|---|---|
| CN | 101986262 A | 3/2011 |
| JP | 2004-303203 | 10/2004 |
| JP | 2005-174301 | 6/2005 |
| JP | 2007-526536 | 9/2007 |
| JP | 2008-513903 | 5/2008 |
| WO | 2005/006183 | 1/2005 |
| WO | 2006/033056 | 3/2006 |

OTHER PUBLICATIONS

Craig Hansen, "Microunity's Mediaprocessor Architecture", IEEE Micro, Aug. 1996, pp. 34-41.
Intel Corporation, "Intel® 64 and IA-32 Architectures Software Developer's Manual: vol. 2 (2A & 2B): Instruction Set Reference, A-Z", 4-212 (chapter 4, p. 212), May 2011.
Office Action issued Sep. 25, 2015 in Chinese Application No. 201280003072.0 (with English translation of Search Report).

* cited by examiner

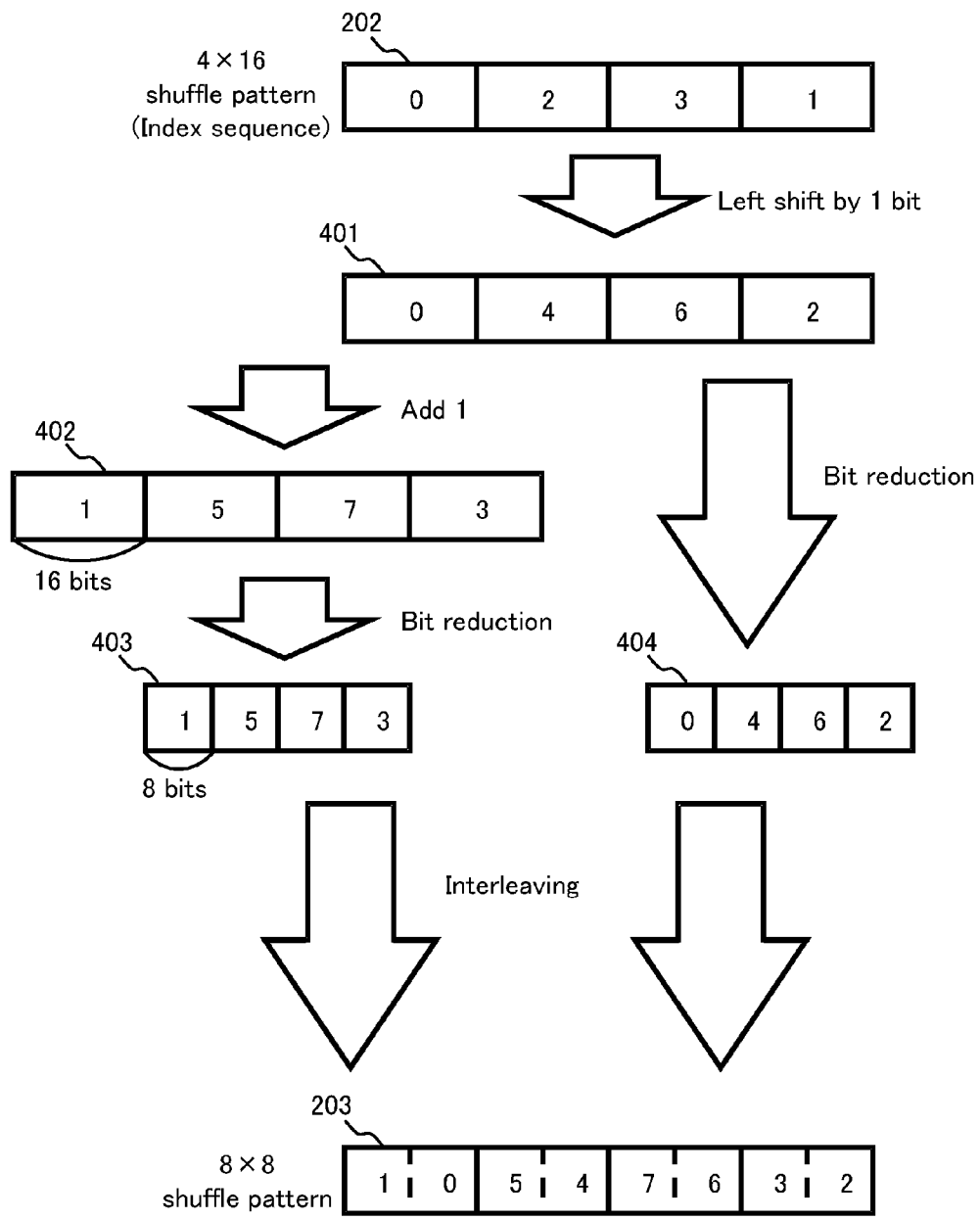

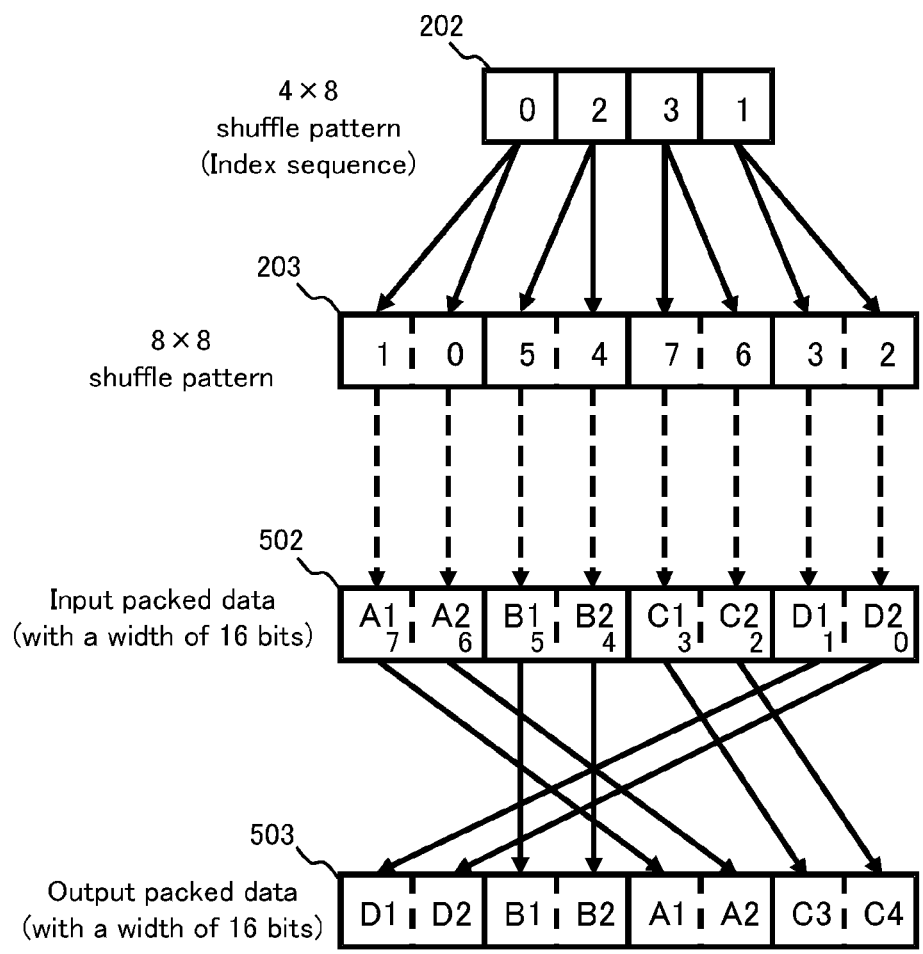

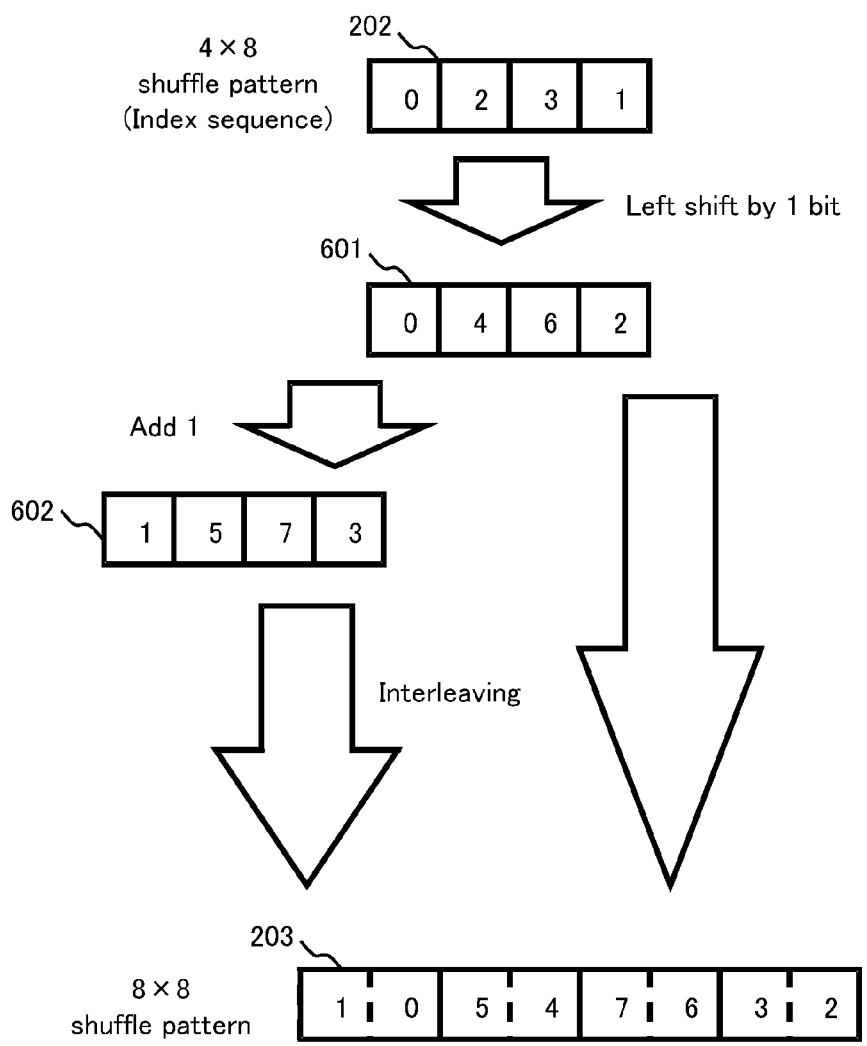

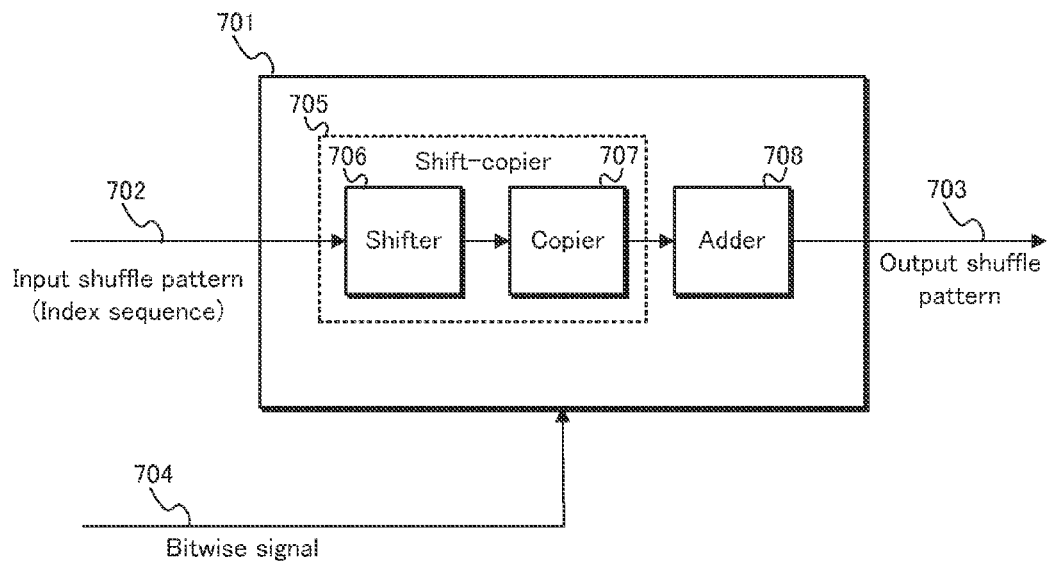

FIG.20

| Input index | Set of output indices | |
|---|---|---|
| 0 | 1 | 0 |
| 1 | 3 | 2 |
| 2 | 5 | 4 |
| 3 | 7 | 6 |

FIG.21

| Input index | Set of output indices | | | |
|---|---|---|---|---|
| 0 | 3 | 2 | 1 | 0 |
| 1 | 7 | 6 | 5 | 4 |
| 2 | 11 | 10 | 9 | 8 |
| 3 | 15 | 14 | 13 | 12 |

FIG.23

```
gensflptnl. 8. 8      Rb:Rb+1, Ra
gensflptnl. 16. 16    Rb:Rb+1, Ra
gensflptnl. 16. 8     Rb:Rb+1, Ra
gensflptn. 16. 8      Rb, Ra
gensflptn. 32. 16     Rb, Ra
gensflptn. 32. 8      Rb, Ra gensflptnl. 8         Rb:Rb+1, Ra
gensflptnl. 16        Rb:Rb+1, Ra
gensflptn. 16         Rb, Ra
gensflptn. 32         Rb, Ra gensflptnl            Rb:Rb+1, Ra
gensflptn             Rb, Ra
```

FIG.24

| Instruction identifying code | Ic | Id | Ra | Rb |
|---|---|---|---|---|

FIG.26A

```
gensflptnl Rc:Rc+1 , Ra , Rb
gensflptn  Rc , Ra, Rb
```

FIG.26B

| Instruction identifying code | Ra | Rb | Rc |

_US 9,292,286 B2_

SHUFFLE PATTERN GENERATING CIRCUIT, PROCESSOR, SHUFFLE PATTERN GENERATING METHOD, AND INSTRUCTION SEQUENCE

TECHNICAL FIELD

The present invention relates to a shuffle pattern generating circuit for generating shuffle patterns used with shuffle instructions.

BACKGROUND ART

In some cases, processors designed for receiving a single data set packed with a plurality of data elements (e.g. SIMD (Single Instruction Multiple Data) processors) require permutation of the data elements contained in the single data set. Such requirement is fulfilled by the use of a shuffle instruction for permuting the data elements.

The following explains operations according to the PSHUFB instruction described in Non-Patent Literature 1 as an example shuffle instruction.

As shown in FIG. 1, the PSHUFB instruction is an instruction to produce output packed data 103 from an input shuffle pattern 101 and input packed data 102.

The shuffle pattern 101 is composed of eight indices, and each index has a width of 8 bits. Each of the input packed data 102 and the output packed data 103 includes eight data elements, and each data element has a width of 8 bits.

Location numbers are given to the data elements contained in the input packed data 102, which specifically are 0, 1, 2, ..., 7 from right to left. Each number indicates the index of the shuffle pattern 101 that identifies the destination of the corresponding data element.

For example, when this PSHUFB instruction is executed, the leftmost data element "A" of the input packed data 102, which corresponds to the index "7", is moved to the location of the index "7" in the shuffle pattern 101, which is the second rightmost index of the shuffle pattern 101. The second rightmost data element "G" of the input packed data 102, which corresponds to the index "1", is moved to the locations of the indices "1" in the shuffle pattern 101, which are the third and the fourth indices from the left of the shuffle pattern 101.

CITATION LIST

Non-Patent Literature

[Non-Patent Literature 1] Intel Corporation: "Intel (R) 64 and IA-32 Architectures Software Developer's Manual Volume 2: Instruction Set Reference, A-Z", 4-212

SUMMARY OF INVENTION

Technical Problem

The Non-Patent Literature 1 does not disclose any method of generating a shuffle pattern used with the PSHUFB instruction.

To achieve high speed processing and to reduce the power consumption, it is preferable to generate a shuffle pattern by simple processing.

The present invention is made in view of the background described above, and aims to provide a shuffle pattern generating circuit that is capable of generating a shuffle pattern by simple processing.

Solution to Problem

One aspect of the present invention provides a shuffle pattern generating circuit comprising: a shift-copier that generates an index sequence by: receiving an input index sequence composed of a plurality of indices, and a signal indicating a number of bits and a number of copies; shifting each index in the input index sequence leftward by the number of bits; and making the number of copies of each index in the input index sequence, and outputs the generated index sequence; and an adder that receives the index sequence output by the shift-copier and a signal indicating an additional value to be added to each index in the index sequence output by the shift-copier, and adds the additional value to each index in the index sequence output by the shift-copier.

Advantageous Effects of Invention

The shuffle pattern generating circuit pertaining to the present invention is capable of generating a shuffle pattern by performing simple processing such as leftward bit shifting, copying, and addition.

BRIEF DESCRIPTION OF DRAWINGS

FIG. 4 is a diagram showing a flow of processing for generating an 8×8 shuffle pattern from a 4×16 shuffle pattern.
FIG. 5 shows a shuffle based on a 4×8 shuffle pattern.
FIG. 6 is a diagram showing a flow of processing for generating an 8×8 shuffle pattern from a 4×8 shuffle pattern.
FIG. 7 is a diagram showing a shuffle pattern generating circuit pertaining to Embodiment 2.
FIG. 8 is a table showing a correspondence between a value of a bitwise signal and an operation performed by each block.
FIG. 20 is a diagram showing a 2×8 index table.
FIG. 21 is a diagram showing a 4×8 index table.

FIG. 23 is a diagram showing a format of a shuffle pattern generating instruction.

FIG. 24 is a diagram showing a bitmap of a shuffle pattern generating instruction.

FIG. 26A is a diagram showing a format of a shuffle pattern generating instruction, and FIG. 26B is a diagram showing a bitmap of a shuffle pattern generating instruction.

DESCRIPTION OF EMBODIMENTS

The following describes embodiments of the present invention with reference to the drawings.

Embodiment 1

The above-describe PSHUFB instruction is a shuffle instruction for eight data elements each having a width of 8 bits, and when the number of the data elements contained in the input packed data or the bit width of each data element is different from the specifications of the PSHUFB instruction, it could be difficult to execute the PSHUFB instruction without change.

In such a case, it is necessary to generate the shuffle pattern again so that the number of the indices contained in the shuffle pattern or the bit width of each index conforms to the specifications of the PSHUFB instruction. Although it may be possible to avoid the above-mentioned necessity by preparing various kinds of shuffle instructions in case the bit width or the number of the data elements is different, such an approach is not adopted in the present embodiment because the feasibility of such an approach greatly depends on the specifications of the processor.

Figure 1:
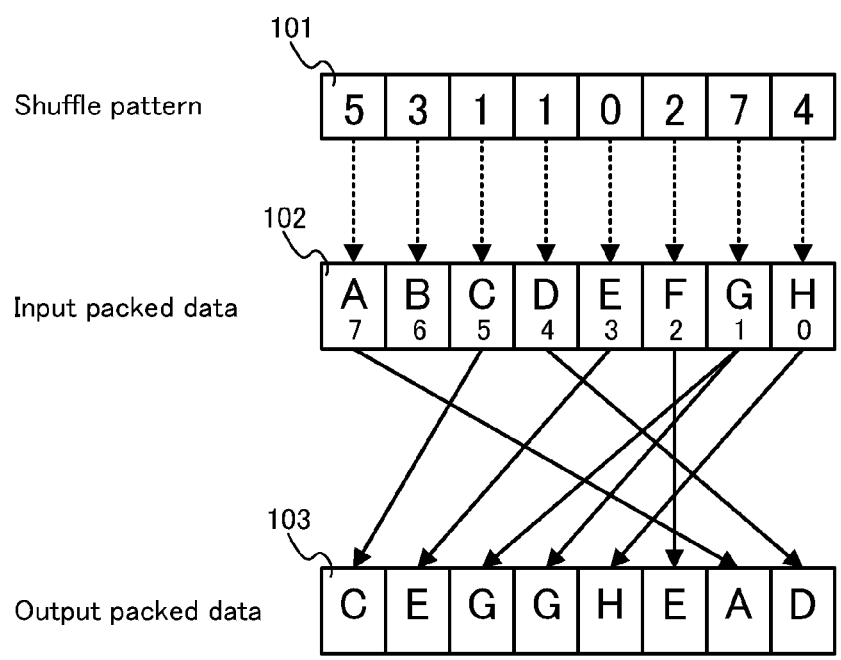
FIG. 1 illustrates example operations according to a PSHUFB instruction.
Figure 2:
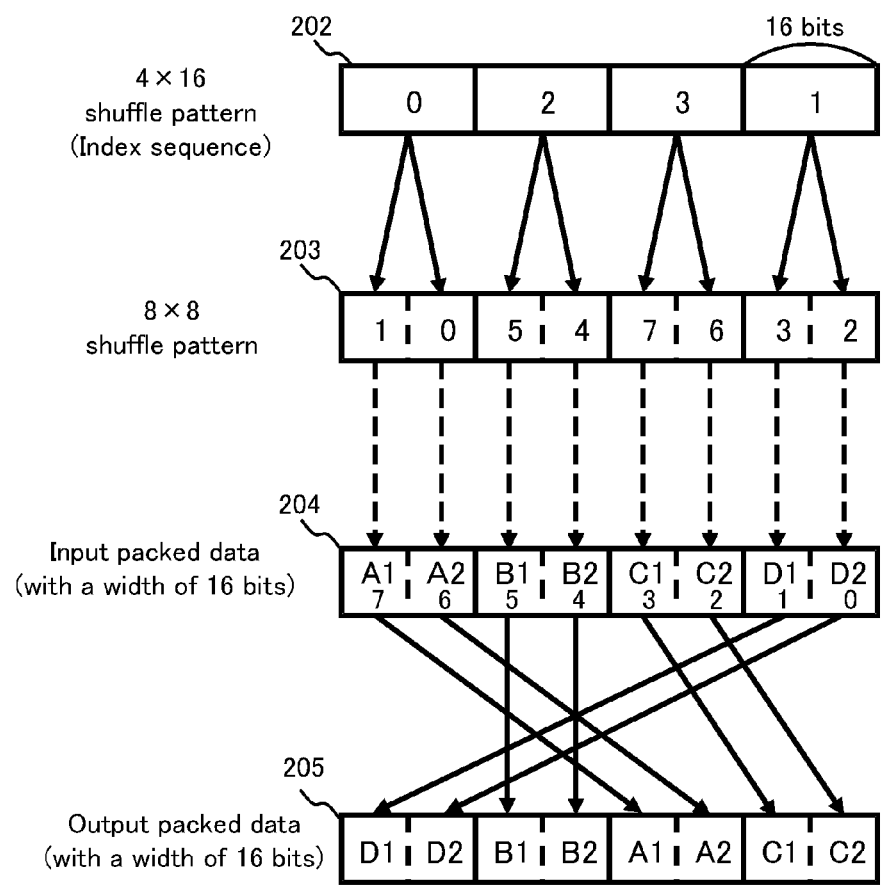
FIG. 2 is a diagram showing a shuffle based on a 4×16 shuffle pattern.

FIG. 2 shows an example case requiring generation of a shuffle pattern.

In the example shown in FIG. 2, an output shuffle pattern 203 composed of eight indices each having a width of 8 bits is generated from an input shuffle pattern 202 composed of four indices each having a width of 16 bits. Thus a shuffle pattern is generated in conformity with the specifications of the PSHUFB instruction.

Shuffling using the generated output shuffle pattern 203 is performed to obtain output packed data 205. In this process, input packed data 204, which is actually composed of four data elements each having a width of 16 bits, is treated as being composed of eight data elements each having a width of 8 bits.

The following description of Embodiment 1 explains a structure for generating, from a given shuffle pattern, another shuffle pattern conforming to the specifications of the PSHUFB instruction in terms of the number of the indices and the bit width. One example is a structure for generating the output shuffle pattern 203 from the input shuffle pattern 202.

Figure 3:
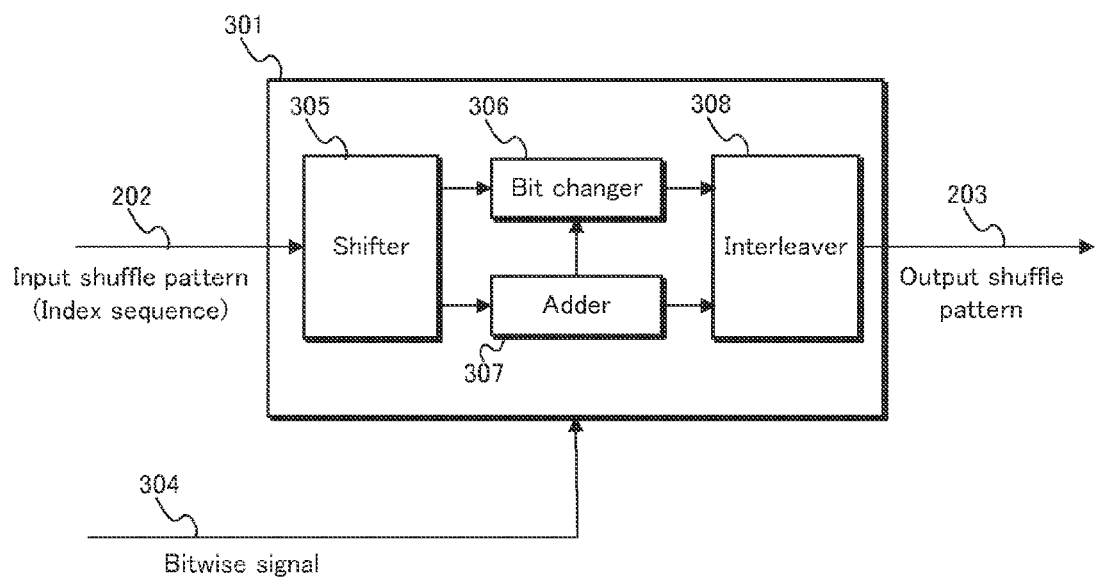
FIG. 3 is a diagram showing a shuffle pattern generating circuit pertaining to Embodiment 1.

As shown in FIG. 3, the shuffle pattern generating circuit 301 pertaining to Embodiment 1 receives an input shuffle pattern 202 and a bitwise signal 304 as the input, and produces an output shuffle pattern 203 as the output.

The bitwise signal 304 indicates, for example, the number of bits for a leftward bit shift, the number of bits for increasing or reducing the bit width, and a value to be added to each index, and controls the operations of the blocks contained in the shuffle pattern generating circuit 301.

According to the bitwise signal 304, the shifter 305 performs a leftward bit shift, the bit changer 306 increases or reduces the bit width, the adder 307 adds a value to each index, and the interleaver 308 interleaves the indices.

FIG. 4 shows the case where the shuffle pattern generating circuit 301 generates an 8×8 shuffle pattern 203 from a 4×16 shuffle pattern 202. Note that "A×B" shuffle pattern represents a shuffle pattern composed of A indices each having a width of B bits.

First, the shifter 305 generates an index sequence 401 by shifting the bits of the 4×16 shuffle pattern 202 leftward by one bit.

Next, the adder 307 generates an index sequence 402 by adding one to each index in the index sequence 401.

Then, the bit changer 306 generates an index sequence 404 and an index sequence 403 by halving the bit width of the index sequence 401 and the bit width of the index sequence 402 from 16 bits to 8 bits, respectively.

Finally, the interleaver 308 generates an 8×8 shuffle pattern 203 by interleaving (i.e. alternating) the data elements included in the index sequence 403 and the index sequence 404.

Another example case that requires a shuffle pattern generation is explained next with reference to FIG. 5. FIG. 5 shows an example case of producing output packed data 503 composed of four 16-bit data elements by shuffling four 16-bit elements contained in input packed data 502 by using the 8×8 shuffle pattern 203 generated from the 4×8 shuffle pattern 202.

In this example, the total bit width (32 bits) of the 4×8 shuffle pattern 202 and the total bit width (64 bits) of the data elements of the input packed data 502 are different. This is because, for example, an SIMD operation performed on the four 8-bit data elements increases the number of necessary bits, and requires increasing the bit width of the data elements. Here, when there only is a shuffle instruction for eight 8-bit data elements such as the above-described PSHUFB instruction, it is necessary to shuffle the four 16-bit data elements contained in the input packed data 402 by treating the input packed data 402 as packed data composed of eight 8-bit data elements. For this reason, the 8×8 shuffle pattern 203 is generated from the 4×8 shuffle pattern 202, and the input packed data 503 is generated by shuffling the data elements of the input packed data 502 by using the generated 8×8 shuffle pattern 203.

FIG. 6 shows the case where the shuffle pattern generating circuit 301 generates the 8×8 shuffle pattern 203 from a 4×8 shuffle pattern 202.

First, the shifter 305 generates an index sequence 601 by shifting the bits of the 4×8 shuffle pattern 202 leftward by 1 bit.

Next, the adder 307 generates the index sequence 602 by adding 1 to each index in the index sequence 601.

Then, the bit changer 306 passes the index sequence 601 and the index sequence 602 to the interleaver 308 without making any change.

Finally, the interleaver 308 generates the 8×8 shuffle pattern 203 by interleaving (i.e. alternating) the data elements included in the index sequence 601 and the index sequence 602.

As described above, the present embodiment is capable of generating a shuffle pattern that is in conformity with the specifications of the PSHUFB instruction or the like in terms of the number of the indices and the bit width. Thus, the present embodiment realizes appropriate shuffling.

Embodiment 2

Embodiment 2 generates a shuffle pattern by an even simpler method.

FIG. 7 is a diagram showing functional blocks of a shuffle pattern generating circuit pertaining to Embodiment 2.

The shuffle pattern generating circuit 701 receives an input shuffle pattern 702 and a bitwise signal 704 as the input and produces an output shuffle pattern 703 as the output. The shuffle pattern generating circuit 701 includes a shift-copier 705 (including a shifter 706 and a copier 707) and an adder 708.

The bitwise signal 704 indicates, for example, the number of bits for a leftward bit shift, the number of copies indicating the number of copies of each index, and an additional value to be added to each index.

The shifter 706, the copier 707 and the adder 708 receive the bitwise signal 704, and perform a leftward bit shift, copy each index, and add the value to each index, respectively. The table in FIG. 8 shows the correspondence between the value of the bitwise signal 704 and the operation performed by each block.

In the table 801, each value in the field 802 for the "bitwise signal" corresponds to the value in the field 803 for "the number of bits for the leftward bit shift" to be performed by the shifter 706, the value in the field 804 for "the number of copies" to be made by the copier 707, and the value in the field 805 for "the additional value to each index" to be added by the adder 708. Each of the shifter 706, the copier 707 and the adder 708 has preset operations to be performed according to the value of the bitwise signal.

The values 0 and 2 of the bitwise signal correspond to the case of generating an 8×8 shuffle pattern from a 4×8 shuffle pattern, and the value 1 of the bitwise signal corresponds to the case of generating a 4×16 shuffle pattern from a 2×16 shuffle pattern.

By preparing several values of the bitwise signal, a shuffle pattern can be generated in conformity with the specifications of the shuffle instruction. The following explains the flow of operations performed by the shuffle pattern generating circuit 701 according to each the value of the bitwise signal.

<The Case of Bitwise Signal 0>

Figure 9:
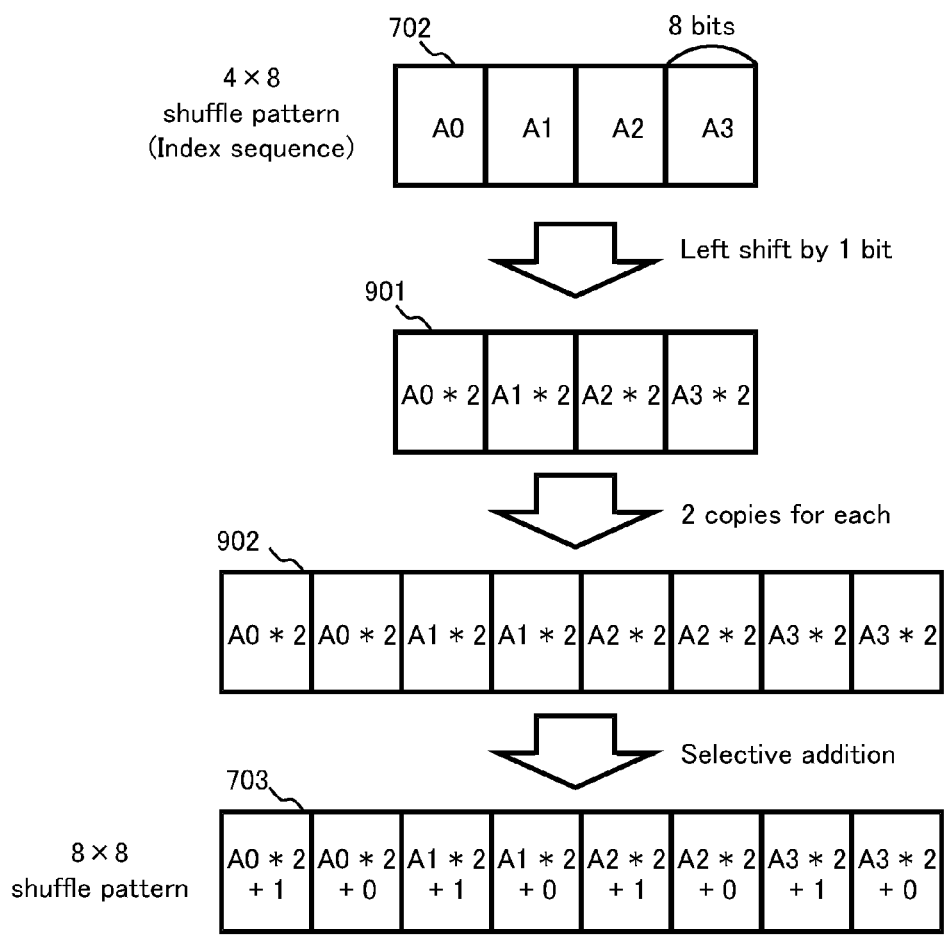
FIG. 9 is a diagram showing a flow of operations for generating an 8×8 shuffle pattern from a 4×8 shuffle pattern.

FIG. 9 shows the flow of operations for generating the 8×8 shuffle pattern 703 from the 4×8 shuffle pattern 702.

First, the shifter 706 generates an index sequence 901 by shifting the indices of the 4×8 shuffle pattern 702 leftward by one bit and extracting the lower 8 bits.

Next, the copier 707 generates an index sequence 902 by making two copies for each index contained in the index sequence 901 after the shift performed by the shifter 706.

Finally, the adder 708 receives the index sequence 902 after the copying by the copier 707, and generates the 8×8 shuffle pattern 703 by adding 1, 0, 1, 0, 1, 0, 1 and 0 to the indices of the index sequence 902, from left to right.

<The Case of Bitwise Signal 1>

Figure 10:
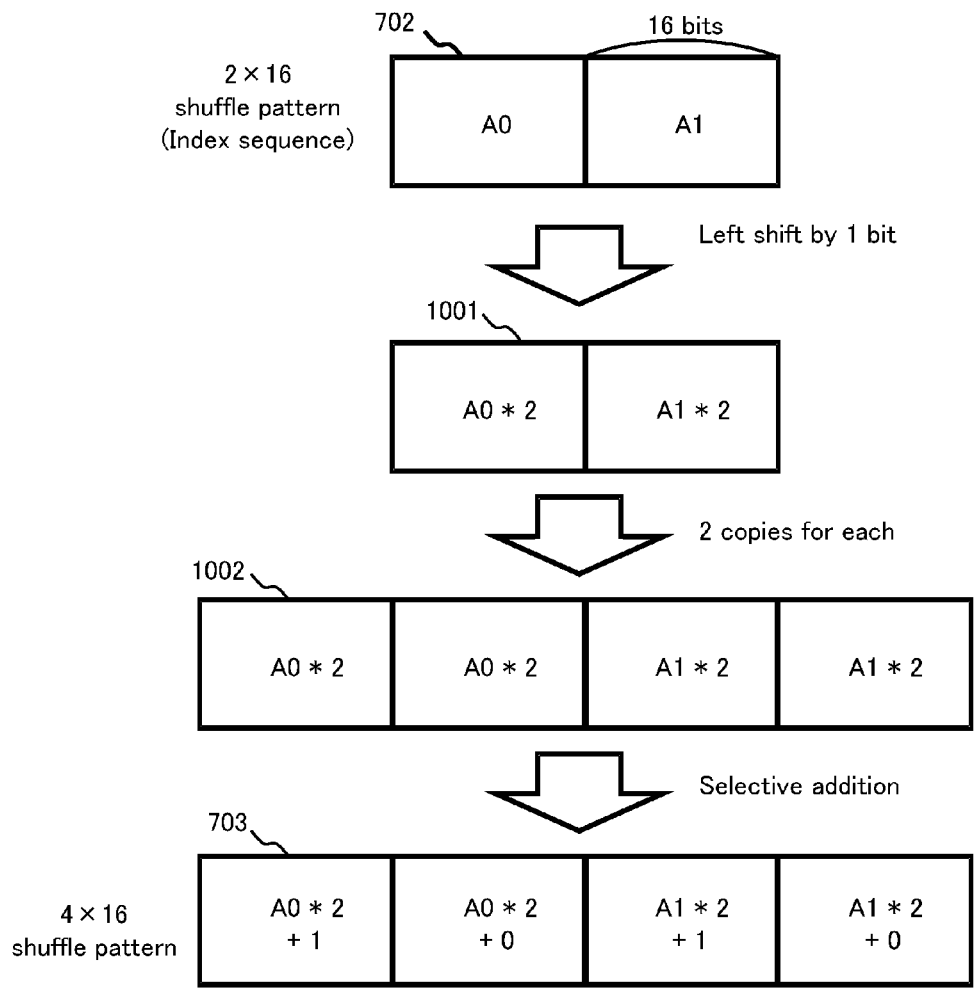
FIG. 10 is a diagram showing a flow of processing for generating a 4×16 shuffle pattern from a 2×16 shuffle pattern.

FIG. 10 shows the flow of operations for generating the 16×4 shuffle pattern 703 from the 2×16 shuffle pattern 702.

First, the shifter 706 generates an index sequence 1001 by shifting the indices of the 2×16 shuffle pattern 702 leftward by one bit and extracting the lower 16 bits.

Next, the copier 707 generates an index sequence 1002 by making two copies for each index contained in the index sequence 1001 after the shift performed by the shifter 706.

Finally, the adder 708 receives the index sequence 1002 after the copying by the copier 707, and generates the 4×16 shuffle pattern 703 by adding 1, 0, 1 and 0 to the indices of the index sequence 1002, from left to right.

<The Case of Bitwise Signal 2>

Although the example depicted in FIG. 9 shows the case of generating a shuffle pattern having eight indices from four indices, it is possible to generate a shuffle pattern having eight indices from two valid indices. Such a case is explained below as the case of bitwise signal 2.

Figure 11:
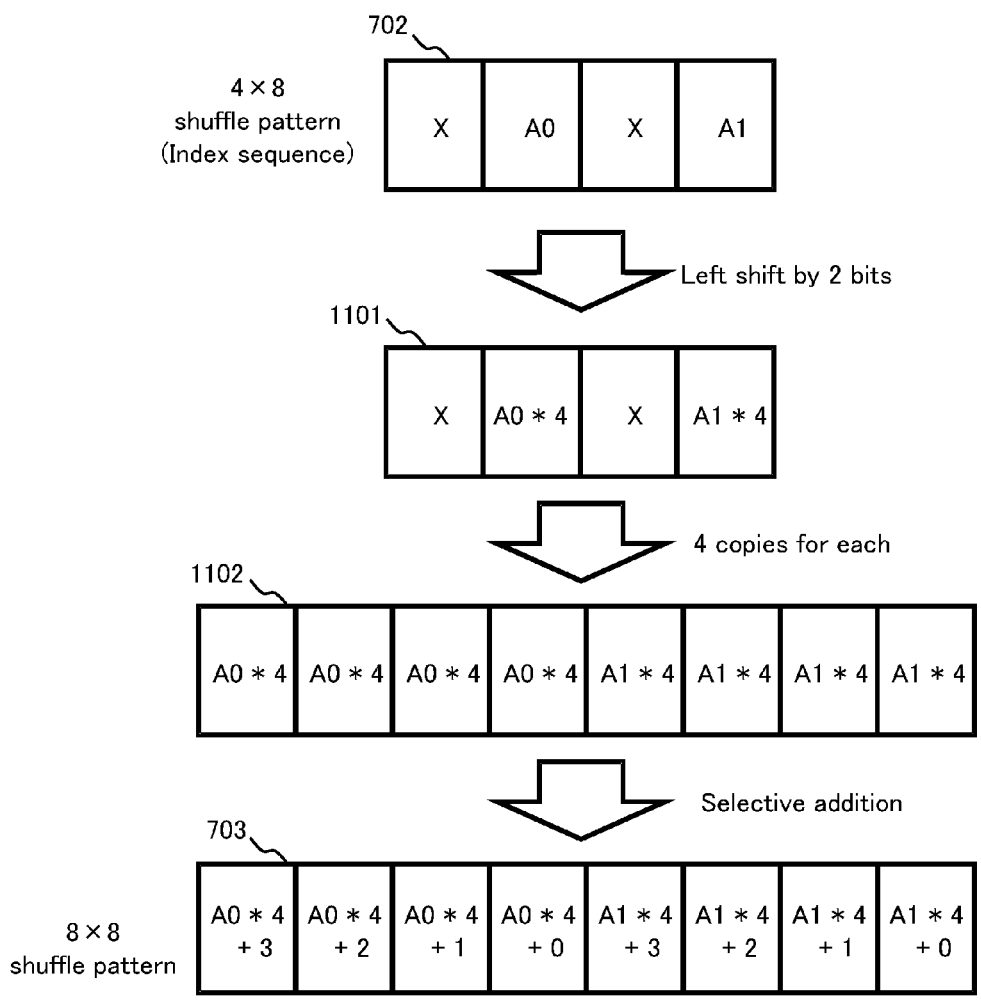
FIG. 11 is a diagram showing a flow of processing for generating an 8×8 shuffle pattern from a 4×8 shuffle pattern.

FIG. 11 shows the flow of operations for generating the 8×8 shuffle pattern 703 from the 4×8 shuffle pattern 702.

The 4×8 shuffle pattern 702 is composed of four indices each having a width of 8 bits.

When receiving a bitwise signal whose value is 2, the shifter 706 treats the second index A0 from the left and the fourth index A1 from the left as valid indices according to a predetermined setting.

The shifter 706 generates an index sequence 1101 by shifting the valid indices A0 and A1 of the 4×8 shuffle pattern 702 leftward by two bits and extracting the lower 8 bits.

Next, the copier 707 generates an index sequence 1102 by making four copies of each index in the index sequence 1101 after the shift performed by the shifter 706.

Finally, the adder 708 receives the index sequence 1102 after the copying by the copier 707, and generates the 8×8 shuffle pattern 703 by adding 3, 2, 1, 0, 3, 2, 1 and 0 to the indices of the index sequence 1102 from left to right.

As described above, the present embodiment is capable of generating a shuffle pattern at a high speed by using the shifter 706, the copier 707 and the adder 708 which are connected in series. Furthermore, since the present embodiment uses only a combination of simple operations such as a leftward bit shift, copying and adding, the present embodiment further reduces the number of the instruction cycles and improves the operating frequency compared to Embodiment 1.

Also, since the present embodiment controls the operations of each block by using the bitwise signal 704, the present embodiment is capable of generating various shuffle patterns having different numbers of indices with different bit widths by using a same circuit configuration.

Figure 12:
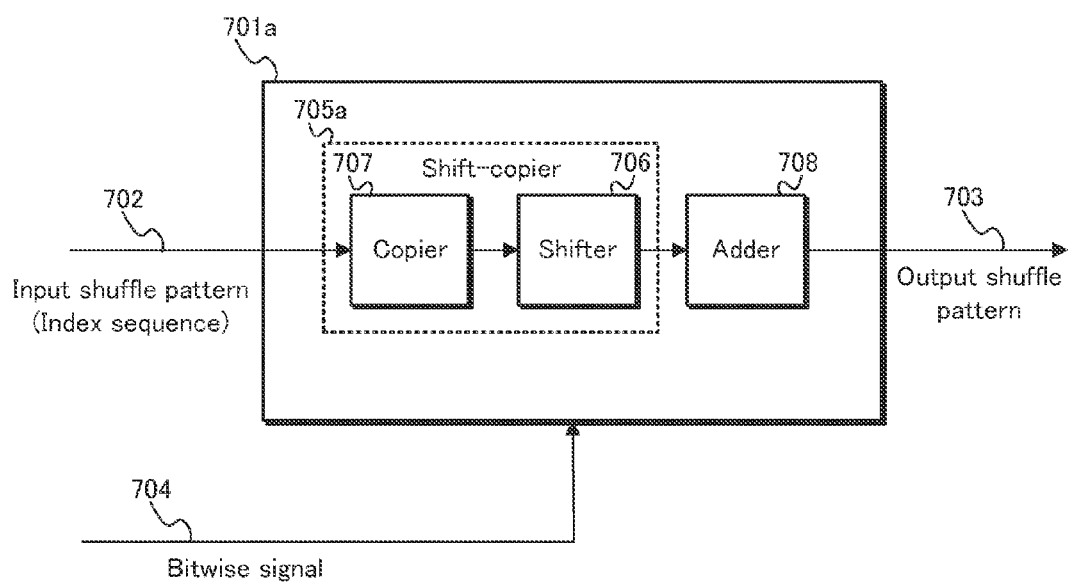
FIG. 12 is a diagram showing a shuffle pattern generating circuit pertaining to a modification of Embodiment 2.

Although the shifter 706, the copier 707 and the adder 708 in the present embodiment are connected in the stated order and sequentially perform their respective operations, the order of the operations may be altered. For example, the shifter 706 may perform the shifting after the copier 707 makes the copies of the indices. As one example, the shuffle pattern generating circuit 701a shown in FIG. 12 includes a shift-copier 705a, in which the shifter 706 performs a leftward bit shift after the copier 707 performs copying.

Figure 13:
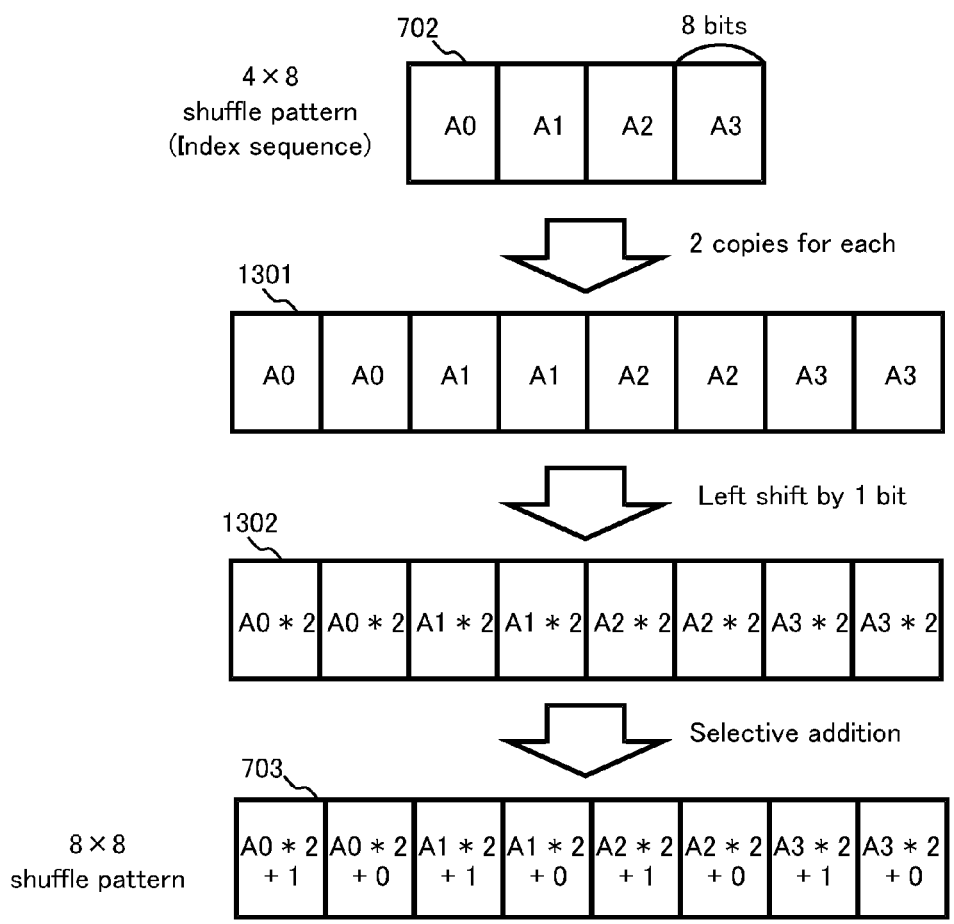
FIG. 13 is a diagram showing a flow of processing for generating an 8×8 shuffle pattern from a 4×8 shuffle pattern according to a modification of Embodiment 2.

With respect to the shuffle pattern generating circuit 701a having such a structure, FIG. 13, like FIG. 9, shows a flow of operations for generating the 8×8 shuffle pattern 703 from the 4×8 shuffle pattern 702.

In FIG. 13, first, the copier 707 generates an index sequence 1301 by making two copies for each index of the 4×8 shuffle pattern 702.

Next, the shifter 706 generates an index sequence 1302 by shifting the index sequence 1301 leftward by one bit and extracting the lower 8 bits.

Finally, the adder 708 receives the index sequence 1302, and generates the 8×8 shuffle pattern 703 by adding 1, 0, 1, 0, 1, 0, 1 and 0 to the indices of the index sequence 1302 from left to right.

Although the present embodiment uses a single bitwise signal 704, each of or some of the shifter 706, the copier 707 and the adder 708 may receive an independent signal.

Furthermore, the bitwise signal 704 may be implemented as two independent bitwise signals, namely a bitwise signal A indicating an input shuffle pattern and a bitwise signal B indicating an output shuffle pattern.

Figure 14:
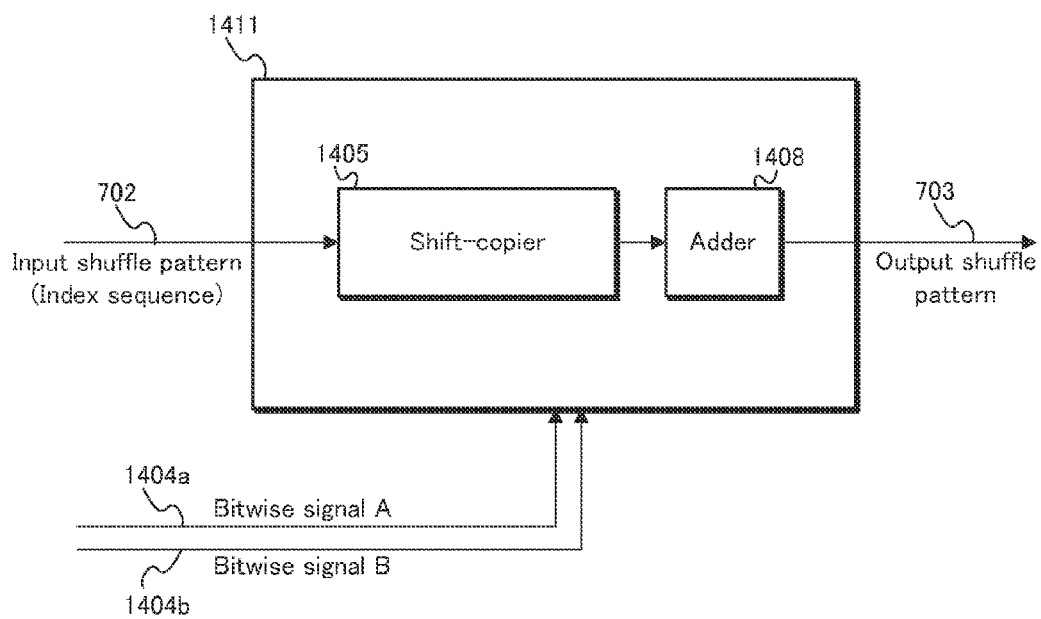
FIG. 14A is a diagram showing a shuffle pattern generating circuit pertaining to a modification.
FIG. 14B is a table showing a correspondence between values of bitwise signals A and B and an operation performed by each block.

FIG. 14 explains one example of such implementation.

As shown in FIG. 14A, a shuffle pattern generating circuit 1411 including a shift-copier 1405 and an adder 1408 receives a bitwise signal A1404a and a bitwise signal B1404b as the input.

As shown in FIG. 14B, the bitwise signal A1404a and the bitwise signal B1404b indicate the number of the indices and the bit width of the indices contained in the input shuffle pattern and the output shuffle pattern, respectively.

Each combination of the value of the bitwise signal A1404a and the value of the bitwise signal B1404b corresponds to the value of "the number of bits for the leftward bit shift" 803 and the value of "the number of copies" 804 to be performed/made by the shift-copier 1405, and "the additional value to each index" 805 to be added by the adder 1408.

Note that the number of the indices and the bit width of the indices in the input shuffle pattern and the output shuffle pattern described as per the present embodiment are only examples, and the present invention should not be limited in this way. For example, the bit width may be extended, or the number of the indices processed by each block (the shifter 706, the copier 707 and the adder 708) may be increased. Alternatively, the bit width of the input shuffle pattern or the output shuffle pattern may be reduced, and accordingly the number of the indices processed by each block (the shifter 706, the copier 707 and the adder 708) may be decreased. By adjusting the bit width and the number of the indices in this way, various shuffle patterns can be generated.

In the present embodiment, it is the shifter 706 that extracts the lower bits with consideration of overflow due to the leftward bit shift. However, the copier 707 and the adder 708 may extract the lower bits in addition to the shifter 706, and the extraction may be collectively performed after the addition for example, instead of being performed by each of them.

Alternatively, saturation processing (i.e. when a given value is greater than the maximum value or below the minimum value of the specified range of the bit width, replace the given value with the maximum value or the minimum value) may be performed instead of or in combination with the lower bit extraction.

In the example shown in FIG. 8, the bitwise signal 704 has plural bits and supports generation of three or more shuffle patterns. However, the number of bits of the bitwise signal 704 is not limited to a plural number. For example, the bitwise signal 704 may be a one-bit signal.

Although each of the shifter 706, the copier 707 and the adder 708 in the present embodiment is a dedicated circuit, these computing circuits may share part or all of their respective functions with one another.

By changing the right-to-left addition of 0, 1, 2, . . . performed by the adder 708 in the present embodiment to left-to-right addition of 0, 1, 2, . . . , the present embodiment can easily modified to support generation of a shuffle pattern for setting the indices of the data elements to 0, 1, 2 . . . from left to right.

Embodiment 3

Embodiment 3 is an attempt to generate a shuffle pattern supporting reduction and increase of the bit width. For this purpose, the shuffle pattern generating circuit of Embodiment 3 is modified from that of Embodiment 2 by adding thereto a bit changer that reduces or increases the bit width.

Figure 15:
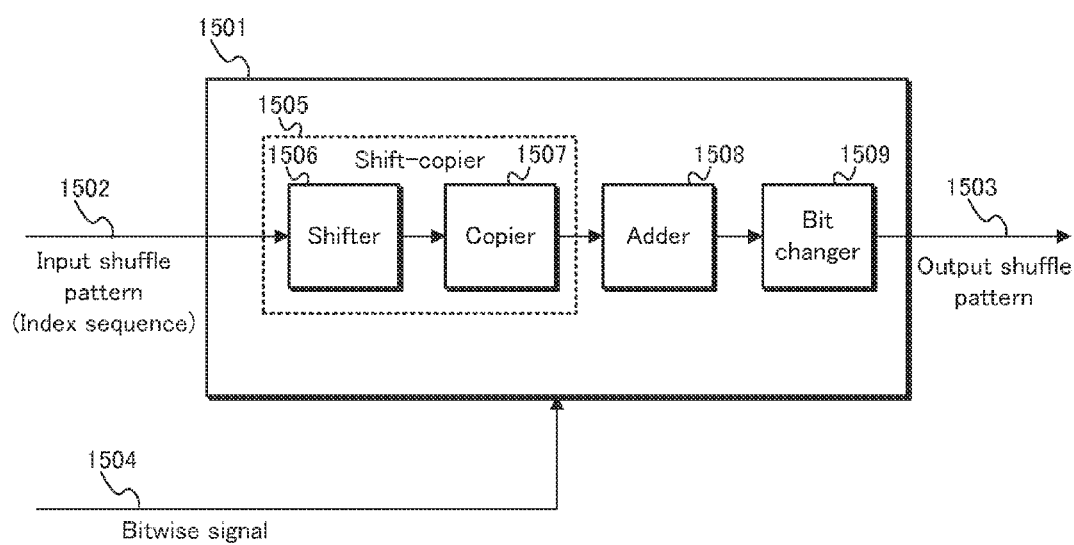
FIG. 15 is a diagram showing a shuffle pattern generating circuit pertaining to Embodiment 3.

As shown in FIG. 15, the shuffle pattern generating circuit 1501 receives an input shuffle pattern 1502 and a bitwise signal 1504 as the input, and produces an output shuffle pattern 1503 as the output. The shuffle pattern generating circuit 1501 includes a shift-copier 1505 (including a shifter 1506 and a copier 1507), an adder 1508 and a bit changer 1509.

The bitwise signal 1504 indicates, for example, the number of bits for a leftward bit shift, the number of copies indicating the number of copies of each index, an additional value to each index, and a width used for a bit width reduction (or increase).

The shifter 1506, the copier 1507, the adder 1508 and the bit changer 1509 receives the bitwise signal 1504, and perform a leftward bit shift, copy each index, add the value to each index, and change the bit width, respectively.

<The Case of Bitwise Signal 0>

The following explains the operations when the value of the bitwise signal 1504 is 0.

Figure 16:
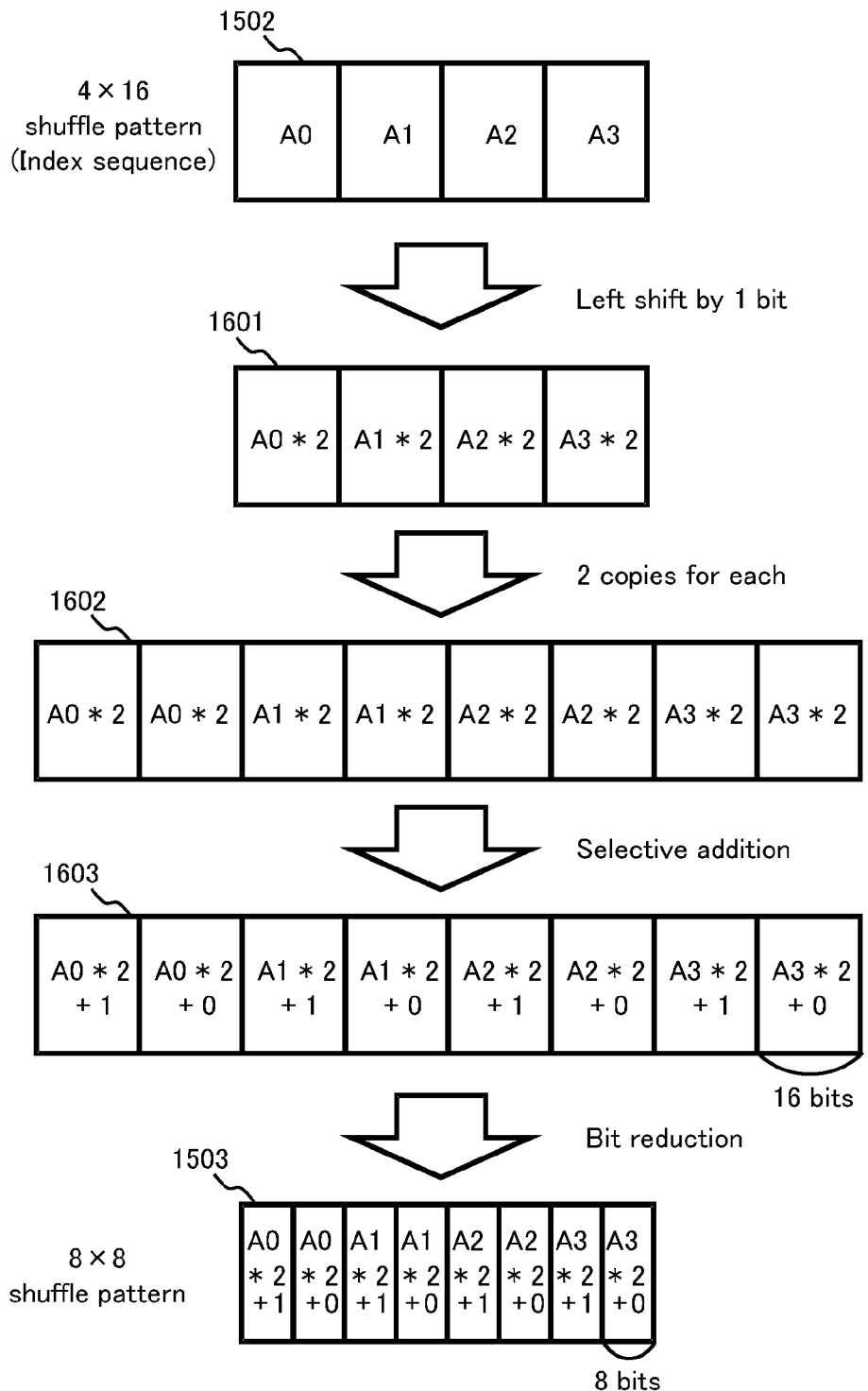
FIG. 16 is a diagram showing a flow of processing for generating an 8×8 shuffle pattern from a 4×16 shuffle pattern.

FIG. 16 shows the flow of operations for generating the 8×8 shuffle pattern 1503 from the 4×16 shuffle pattern 1502.

First, the shifter 1506 generates an index sequence 1601 by shifting the indices of the 4×16 shuffle pattern 1502 leftward by one bit and extracting the lower 16 bits.

Next, the copier 1507 generates an index sequence 1602 by making two copies for each index of the index sequence 1601.

Then, the adder 1508 adds 1, 0, 1, 0, 1, 0, 1 and 0 to the indices of the index sequence 1602 from left to right.

Finally, the bit changer 1509 generates the 8×8 shuffle pattern 1503 by extracting the lower 8 bits from the 16-bit indices of the index sequence 1603 obtained by the addition.

<The Case of Bitwise Signal 1>

The following explains the operations when the value of the bitwise signal 1504 is 1.

Figure 17:
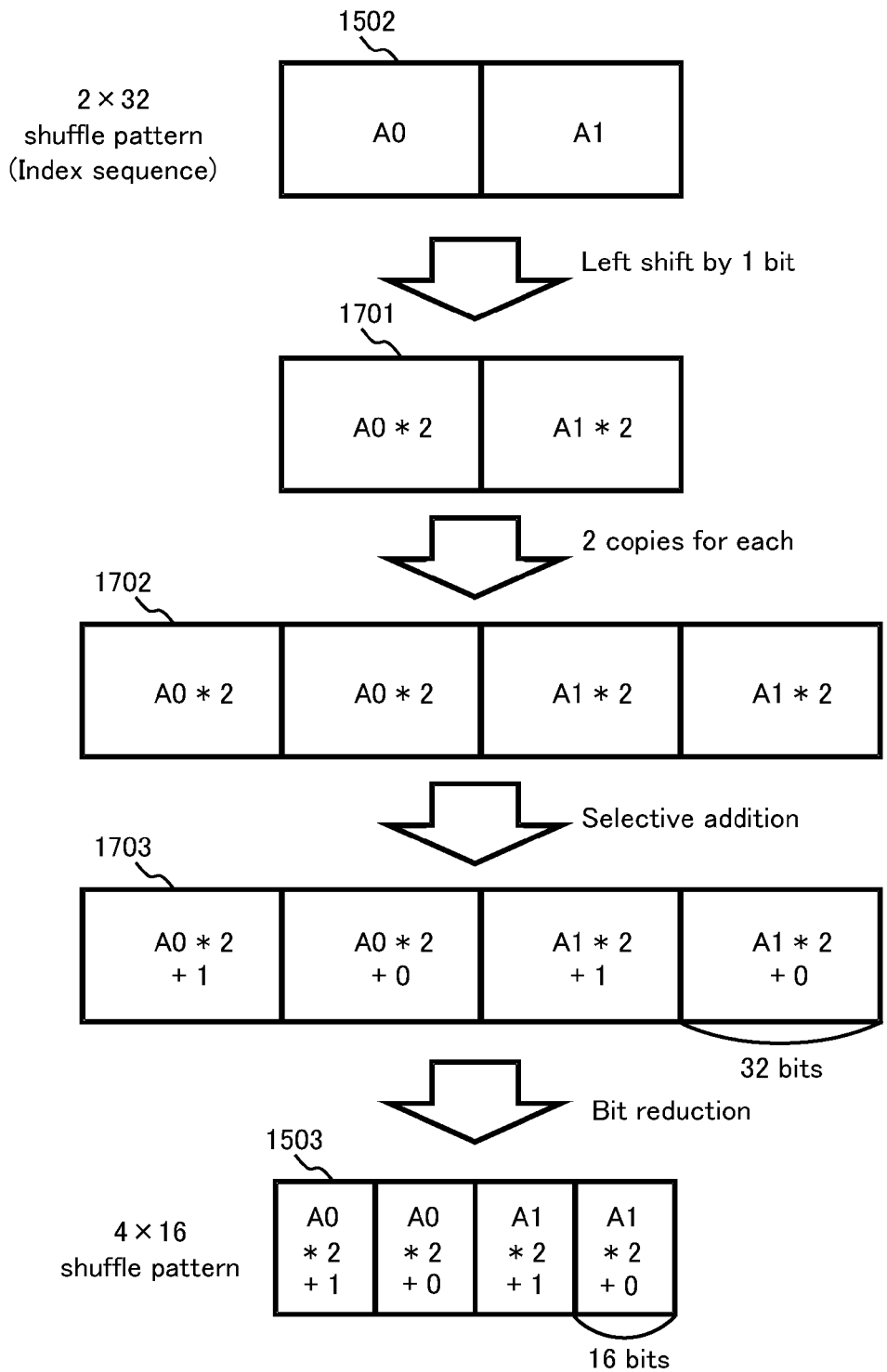
FIG. 17 is a diagram showing a flow of processing for generating a 4×16 shuffle pattern from a 2×32 shuffle pattern.

FIG. 17 shows the flow of operations for generating the 4×16 shuffle pattern 1503 from the 2×32 shuffle pattern 1502.

First, the shifter 1506 generates an index sequence 1701 by shifting the indices of the 2×32 shuffle pattern 1502 leftward by one bit and extracting the lower 32 bits.

Next, the copier 1507 generates an index sequence 1702 by making two copies for each index of the index sequence 1701.

Then, the adder 1508 adds 1, 0, 1 and 0 to the indices of the index sequence 1702 from left to right.

Finally, the bit changer 1509 generates the 4×16 shuffle pattern 1503 by extracting the lower 16 bits from the 32-bit indices of the index sequence 1703 obtained by the addition.

<The Case of Bitwise Signal 2>

The present embodiment supports not only the cases shown in FIGS. 16 and 17 but also the case of generating an 8×8 shuffle pattern from a 2×32 shuffle pattern. Such a case is explained below as the case of bitwise signal 2.

Figure 18:
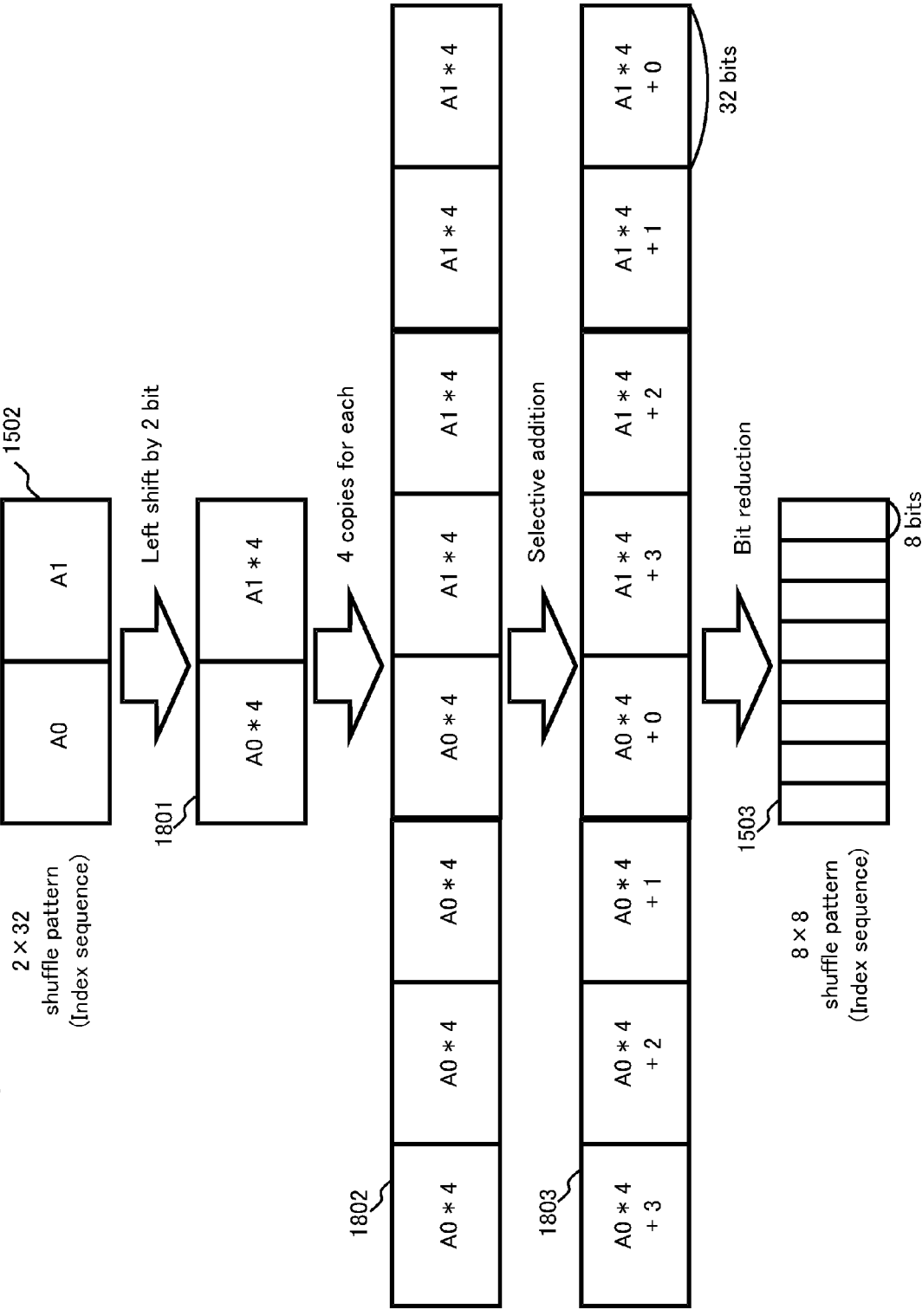
FIG. 18 is a diagram showing a flow of processing for generating an 8×8 shuffle pattern from a 2×32 shuffle pattern.

FIG. 18 shows the flow of operations for generating the 8×8 shuffle pattern 1503 from the 2×32 shuffle pattern 1502.

First, the shifter 1506 generates an index sequence 1801 by shifting the indices of the 2×32 shuffle pattern 1502 leftward by two bits and extracting the lower 32 bits.

Next, the copier 1507 generates an index sequence 1802 by making four copies for each index of the index sequence 1801.

Then, the adder 1508 adds 3, 2, 1, 0, 3, 2, 1 and 0 to the indices of the index sequence 1802 from left to right.

Finally, the bit changer 1509 generates the 8×8 shuffle pattern 1503 by extracting the lower 8 bits from the 32-bit indices of the index sequence 1803 obtained by the addition.

As described above, the present embodiment is capable of generating a shuffle pattern at a high speed by using the shifter 1506, the copier 1507, the adder 1508 and the bit changer 1509 which are connected in series.

In particular, owing to the bit changer 1509, the present embodiment is capable of generating a shuffle pattern at a high speed even when the input shuffle pattern and the output shuffle pattern has the same bit width.

Also, since the present embodiment controls the operations of each block by using the bitwise signal 1504, the present embodiment is capable of generating various shuffle patterns having different numbers of indices with different bit widths by using a same circuit configuration.

Note that the number of the indices and the bit width of the indices in the input shuffle pattern and the output shuffle pattern described as per the present embodiment are only examples, and the present invention should not be limited in this way. For example, the bit width may be extended, or the number of the indices processed by each block (the shifter 1506, the copier 1507 the adder 1508 and the bit changer 1509) may be increased. Alternatively, the bit width of the input shuffle pattern or the output shuffle pattern may be reduced, and accordingly the number of the indices processed by each block (the shifter 1506, the copier 1507 and the adder 1508 and the bit changer 1509) may be decreased.

Although the shifter 1506, the copier 1507, the adder 1508 and the bit changer 1509 in the present embodiment sequentially perform their respective operations in the stated order, the order of the operations may be altered. Like Embodiment 2 shown in FIG. 12, the order of the operations performed by the copier 1507 and the shifter 1506 may be reversed. Also, the bit changer 1509 may be inserted before or after the shifter 1506, before or after the copier 1507, or before or after the adder 1508.

In the present embodiment, the bitwise signal 1504 has plural bits. However, the number of bits of the bitwise signal 1504 is not limited to a plural number. For example, the bitwise signal 1504 may be a one-bit signal indicating either 0 or 1.

Although the present embodiment uses a single bitwise signal 1504, each of or some of the shifter 1506, the copier 1507, the adder 1508 and the bit changer 1509 may receive an independent signal. Furthermore, like the case shown in FIG. 14, the bitwise signal 1504 may be implemented as two independent bitwise signals, namely a bitwise signal A indicating an input shuffle pattern and a bitwise signal B indicating an output shuffle pattern.

Although each of the shifter 1506, the copier 1507, the copier 1507, the adder 1508 and the bit changer 1509 in the present embodiment is a dedicated circuit, these computing circuits may share part or all of their respective functions with one another.

Furthermore, the various structures explained in the latter half of the description of Embodiment 2 may be combined with the present embodiment.

Embodiment 4

Figure 19:
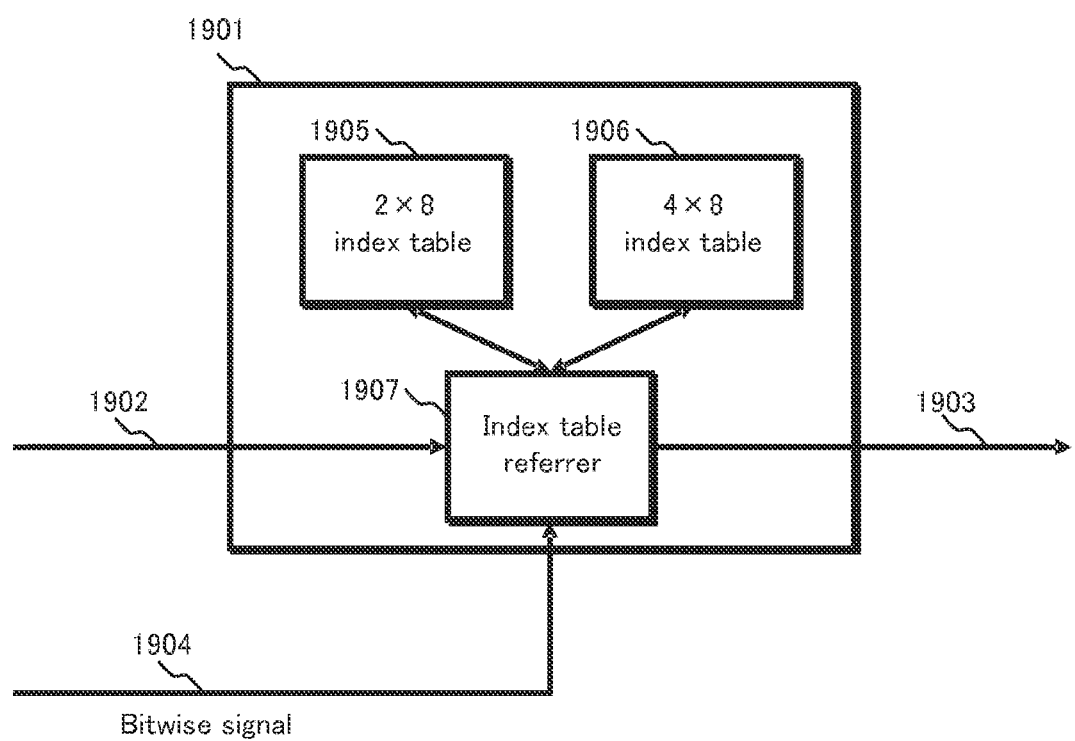
FIG. 19 is a diagram showing a shuffle pattern generating circuit pertaining to Embodiment 4.

FIG. 19 is a diagram showing a shuffle pattern generating circuit pertaining to Embodiment 4.

In FIG. 19, the shuffle pattern generating circuit 1901 generates a 64-bit output shuffle pattern 1903 from a 32-bit input shuffle pattern 1902. The shuffle pattern generating circuit 1901 includes a 2×8 index table 1905, a 4×8 index table 1906 and an index table referrer 1907.

The 2×8 index table 1905 receives four 8-bit indices as the input, and outputs two 8-bit indices for each of the input indices.

FIG. 20 shows data contained in the 2×8 index table 1905. When the input 8-bit index is 0 for example, the 2×8 index table 1905 outputs two 8-bit indices, namely 1 and 0.

The 4×8 index table 1906 receives two 16-bit indices as the input, and outputs four 8-bit indices for each of the input indices. FIG. 21 shows data contained in the 4×8 index table 1906. When the input 16-bit index is 0 for example, the 4×8 index table 1906 outputs four 8-bit indices, namely 3, 2, 1 and 0.

The index table referrer 1907 receives the input bitwise signal 1904, and passes the indices to the table indicated by the bitwise signal 1904. Then, the index table referrer 1907 receives, from the table, indices corresponding to the indices passed to the table, and generates a shuffle pattern based on the indices so received.

In the present embodiment, when the value of the bitwise signal 1904 is 0, the index table referrer 1907 passes the indices to the 2×8 index table 1905, and when the value of the bitwise signal 1904 is 1, the index table referrer 1907 passes the indices to the 4×8 index table 1906. The following explains the operations when the value of the bitwise signal 1904 is 0 and when the value of the value of the bitwise signal 1904 is 1.

<The Case of Bitwise Signal 0>

The following explains the operations when the value of the bitwise signal 1904 is 0.

The input shuffle pattern 1902 is composed of four 8-bit indices, and the output shuffle pattern 1903 is composed of eight 8-bit indices. The index table referrer 1907 passes each index of the shuffle pattern 1902 to the 2×8 index table 1905.

The 2×8 index table 1905 outputs two indices for each input index, and passes the two indices to the index table referrer 1907. The index table referrer 1907 generates the output shuffle pattern 1903 by sequentially concatenating the indices corresponding to the leftmost index of the input shuffle pattern, the indices corresponding to the index on the right of the leftmost index, and so on.

For example, when the four 8-bit indices are "0, 1, 2, 3", The 2×8 index table 1905 generates:
"1, 0" from the input index "0";
"3, 2" from the input index "1";
"5, 4" from the input index "2"; and
"7, 6" from the input index "3",
and outputs the generated indices.

The index table referrer 1907 concatenates the four sets of output indices from left to right, and thereby generates a shuffle pattern "1, 0, 3, 2, 5, 4, 7, 6".

<The Case of Bitwise Signal 1>

The following explains the operations when the value of the bitwise signal 1904 is 1. The input shuffle pattern 1902 is composed of two 16-bit indices, and the output shuffle pattern 1903 is composed of eight 8-bit indices. The index table referrer 1907 passes each index of the shuffle pattern 1902 to the 4×8 index table 1906.

The 4×8 index table 1906 extracts four indices for each input index, and passes the four indices to the index table referrer 1907. The index table referrer 1907 generates the output shuffle pattern 1903 by sequentially concatenating the indices corresponding to the leftmost index of the input shuffle pattern, the indices corresponding to the index on the right of the leftmost index, and so on.

For example, when the two 16-bit indices are "0, 1",
The 4×8 index table 1906 generates:
"3, 2, 1, 0" from the input index "0"; and
"7, 6, 5, 4" from the input index "1",
and outputs the generated indices.

The index table referrer 1907 concatenates the two groups of output indices from left to right, and thereby generates a shuffle pattern "3, 2, 1, 0, 7, 6, 5, 4".

With the structure described above, Embodiment 4 is capable of generating a shuffle pattern supporting a plurality of combinations of index bit widths by switching between the index tables according to the value of the bitwise signal 1904.

In the present embodiment, for example the values of the indices stored in the index tables and the number of indices to be output for one index may be different from those described above.

Although the index tables of the present embodiment receives a plurality of indices as input values, a plurality of index tables each receiving only one input value may be provided. Alternatively, a logical circuit such as a multi-input single-output selector may be used instead of the tables.

Although each of the 2×8 index table 1905, 4×8 index table 1906 and the index table referrer 1907 in the present embodiment is a dedicated circuit, these computing circuits may share part or all of their respective functions with one another.

Embodiment 5

Figure 22:
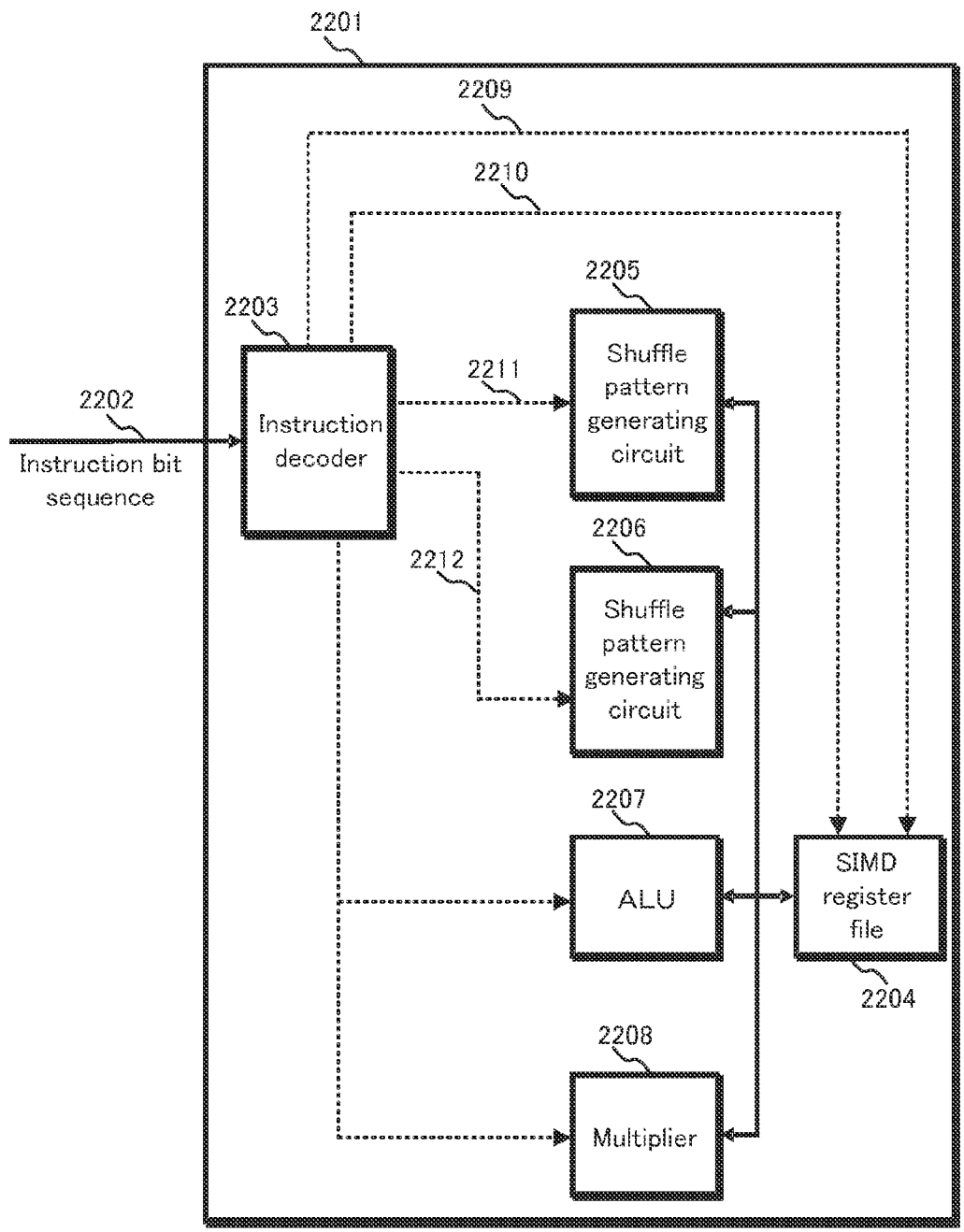
FIG. 22 is a diagram showing a processor pertaining to Embodiment 5.

FIG. 22 is a diagram showing a processor including a shuffle pattern generating circuit pertaining to Embodiment 5.

In FIG. 22, a processor 2201 performs processing for a 32-bit instruction bit sequence 2202. The processor 2201 includes an instruction decoder 2203, an SIMD register file 2204, shuffle pattern generating circuits 2205 and 2206, an ALU 2207 and a multiplier 2208. The shuffle pattern generating circuit 2205 has the same structure as the shuffle pattern generating circuit 701 of Embodiment 2, and the shuffle pattern generating circuit 2206 has the same structure as the shuffle pattern generating circuit 1501 of Embodiment 3.

The input shuffle patterns 702 and 1502 related to the shuffle pattern generating circuits 701 and 1501 of Embodiments 2 and 3 correspond to the input shuffle pattern received from the SIMD register file 2204. Also, the output shuffle patterns 703 and 1503 correspond to the output shuffle pattern passed to the SIMD register file 2204, and the bitwise signals 704 and 1504 correspond to the bitwise signals 2211 and 2212.

The SIMD register file 2204 has thirty-two 64-bit SIMD registers, which are represented as R0 to R31.

FIG. 23 shows the format of a sequence of shuffle pattern generating instructions that uses the shuffle pattern generating circuits 2205 and 2206.

The gensflptnl. 8. 8 instruction is an instruction to generate a 16×8 shuffle pattern from an 8×8 shuffle pattern. According to this instruction, the processor 2201 acquires an input shuffle pattern composed of eight 8-bit indices from the SIMD register Ra, generates an output shuffle pattern composed of sixteen 8-bit indices, writes the upper 64 bits of the output shuffle pattern into the SIMD register Rb, and writes the lower 64 bits into the next register (Rb+1).

Similarly, the gensflptnl. 16. 16 instruction and the gensflptnl. 16. 8 instruction are respectively an instruction to generate an 8×16 shuffle pattern from a 4×16 shuffle pattern and an instruction to generate a 16×8 shuffle pattern from a 4×16 shuffle pattern.

The gensflptn. 16. 8 instruction is an instruction to generate an 8×8 shuffle pattern from a 4×16 shuffle pattern. According to this instruction, the processor 2201 acquires an input shuffle pattern composed of four 16-bit indices from the SIMD register Ra, generates an output shuffle pattern composed of eight 8-bit indices, and writes the output shuffle pattern into the SIMD register Rb.

Similarly, the gensflptn. 32. 16 instruction and the gensflptn. 32. 8 instruction are respectively an instruction to generate a 4×16 shuffle pattern from a 2×32 shuffle pattern and an instruction to generate an 8×8 shuffle pattern from a 2×32 shuffle pattern.

The gensflptnl. 8 instruction and the gensflptnl instruction are aliases of the gensflptnl. 8. 8 instruction. The gensflptnl. 16 instruction is an alias of the gensflptnl. 16. 16 instruction. Similarly, the gensflptn. 16 instruction and the gensflptn instruction are aliases of the gensflptn. 16. 8 instruction, and the gensflptn. 32 instruction is an alias of the gensflptn. 32. 16 instruction.

FIG. 24 shows the bitmap of the instruction format shown in FIG. 23. The bitmap is composed of an instruction identifying code of 20 bits, an Ra region of five bits, an Rb region of five bits, an Ic region of 1 bit, and an Id region of 1 bit.

The instruction identifying code indicates the gensflptnl instruction or the gensflptn instruction. The instruction identifying code is "0" when indicating the gensflptnl instruction, and the instruction identifying code is "1" when indicating the gensflptn instruction. The Ra region indicates the register for storing the input shuffle pattern, and the Rb region indicates the register for storing the output shuffle pattern. The Ic region indicates the bit width of the indices of the input shuffle pattern. The Ic region is "0" when the bit width of the input shuffle pattern is 16 bits, and the IC region is "1" when the bit width is 32 bits. The Id region indicates the bit width of the indices of the output shuffle pattern. The Ic region is "0" when the bit width of the output shuffle pattern is 8 bits, and the Ic region is "1" when the bit width is 16 bits.

Following explains an example operation performed by the processor 2201 according to a gensflptnl.8.8 R0: R1, R4 instruction. The instruction decoder 2203 acquires an instruction bit sequence 2202, and detects from the instruction identifying code that the instruction is a gensflptnl instruction. Then, using an input register number signal 2209 and an output register number signal 2210, the instruction decoder 2203 provides the SIMD register file 2204 with information indicating that the SIMD registers for storing the input and output shuffle patterns are respectively R4 and R0. In the case of a gensflptnl instruction, the shuffle pattern generating circuit 2205 is driven. Therefore, using the bitwise signal 2211, the instruction decoder 2203 provides the shuffle pattern generating circuit 2205 with information indicating that the bit width of the indices of the input and output shuffle patterns is 8 bits. The instruction decoder 2203 provides no information to the shuffle pattern generating circuit 2206 via the bitwise signal 2212. The SIMD register file 2204 acquires a 64-bit shuffle pattern from the SIMD register R4 according to the input register number signal 2209, and passes the shuffle pattern to the shuffle pattern generating circuit 2205. The shuffle pattern generating circuit 2205 generates a shuffle pattern according to the bitwise signal 2211 from the instruction decoder 2203.

The shuffle pattern generating circuit 2205 performs the same operations as the shuffle pattern generating circuit 701 of Embodiment 2, and generates a 16×8 shuffle pattern from an 8×8 shuffle pattern. According to the output register number signal 2210, the SIMD register file writes the upper 64 bits of the shuffle pattern acquired from the shuffle pattern generating circuit 2205 into the SIMD register R0, and the lower 64 bits into the SIMD register R1.

Following explains another example operation performed by the processor 2201 according to a gensflptn. 16. 8 R0, R4 instruction. The instruction decoder 2203 acquires an instruction bit sequence 2202, and detects from the instruction identifying code that the instruction is a gensflptn instruction. Then, using the input register number signal 2209 and the output register number signal 2210, the instruction decoder 2203 provides the SIMD register file 2204 with information indicating that the SIMD registers for storing the input and output shuffle patterns are respectively R4 and R0. In the case of a gensflptn instruction, the shuffle pattern generating circuit 2206 is driven. Therefore, using the bitwise signal 2212, the instruction decoder 2203 provides the shuffle pattern generating circuit 2206 with information indicating that the bit width of the indices of the input shuffle pattern and the bit width of the indices of the output shuffle pattern are respectively 16 bits and 8 bits. The instruction decoder 2203 provides no information to the shuffle pattern generating circuit 2205 via the bitwise signal 2211. The SIMD register file 2204 acquires a 64-bit shuffle pattern from the SIMD register R4 according to the input register number signal 2209, and passes the shuffle pattern to the shuffle pattern generating circuit 2206. The shuffle pattern generating circuit 2206 generates a shuffle pattern according to the bitwise signal 2212 from the instruction decoder 2203. The shuffle pattern generating circuit 2206 performs the same operations as the shuffle pattern generating circuit 1501 of Embodiment 3, and generates an 8×8 shuffle pattern from a 4×16 shuffle pattern. According to the output register number signal 2210, the SIMD register file writes the shuffle pattern acquired from the shuffle pattern generating circuit 2206 into the SIMD register R0.

With the stated structure, the processor needs only a single instruction to generate a shuffle pattern.

In the present embodiment, the shuffle pattern generating circuit 2205 has the same structure as the shuffle pattern generating circuit 701, and the shuffle pattern generating circuit 2206 has the same structure as the shuffle pattern generating circuit 1501. However, one or both of these circuits may be the shuffle pattern generating circuit 1901 (FIG. 19) of Embodiment 4. Only the shuffle pattern generating circuit of Embodiment 2, 3 or 4 may be included.

In the present embodiment, each of the shuffle pattern generating circuits 2205 and 2206 includes the ALU 2207 and the multiplier 2208. However, each circuit may have a plurality of ALUs and a plurality of multipliers, or other computing circuits.

The bitwise signals 2211 and 2212 may be separately implemented as, for example, an input shuffle pattern bitwise signal and an output shuffle pattern bitwise signal. Also, an additional signal may be used to directly specify the amount of a shift performed by the shifter included in the shuffle pattern generating circuit for example.

In the present embodiment, the shuffle pattern generating circuits 2205 and 2206 are dedicated circuits. However, these circuits may share part or all of their functions with the ALU 2207, the multiplier 2208 or other computing circuits.

The present embodiment has the SIMD register file 2204. However, the SIMD register file 2204 may have another special register.

The present embodiment uses six kinds of instructions. However, the embodiment may use only some kinds of the instructions, or another shuffle instruction corresponding to other index bit width.

In the present embodiment, some of the instructions have aliases. However, the correspondence between the names and the aliases is not limited to the correspondence described above. Furthermore, it is not necessary to use such aliases, or to use only the name described as aliases.

In the present embodiment, each of the Ic region and the Id region in the bitmap of the shuffle instruction is assigned one bit. However, they may be assigned a plurality of bits.

In the present embodiment, the Ic region and the Id region in the bitmap are separate bit regions. However, they may be integrated as one region. Also, a single bit value may indicate both the index bit width of the input shuffle pattern and the output shuffle pattern in combination. For example, the value "0" may indicate generation of a 16×8 shuffle pattern from an 8×8 shuffle pattern, and the value "1" may indicate generation of a 16×8 shuffle pattern from a 4×16 shuffle pattern.

In the present embodiment, the bits of the Ic region and the Id region in the bitmap are explained as independent from the instruction identifying code. However, the Ic region and the Id region may be included in the instruction identifying code.

In the present embodiment, the instruction bit sequence 2202 has a width of 32 bits. However, the instruction bit sequence 2202 may have a different bit width.

In the present embodiment, the SIMD register file 2204 has thirty-two 64-bit registers. However, the number and the bit width of the registers are not necessarily 32 and 64, respectively.

The present embodiment may be provided as a shuffle pattern generation method including the steps shown in FIG. 24.

Embodiment 6

This section provides a further explanation of the instructions related to generation of the shuffle patterns described in FIG. 23 corresponding to Embodiment 5, for example.

FIG. 26A is a diagram showing a format of a shuffle pattern generating instruction.

The gensflptnl instruction is an instruction to acquire an input shuffle pattern from the SIMD register Ra, to generate an output shuffle pattern according to the input/output shuffle patterns determined by the value of Rb, and to write a predetermined number of the upper bits of the generated output shuffle pattern into the SIMD register Rc, and a predetermined number of the lower bits into the next register (Rc+1).

The gensflptn instruction is an instruction to acquire an input shuffle pattern from the SIMD register Ra, to generate an output shuffle pattern according to the input/output shuffle patterns determined by the value of Rb, and to write the generated output shuffle pattern into the SIMD register Rc.

The following explains the specifications of the instructions.

(Instruction 1) gensflptnl. 8. 8 Rb: Rb+1, Ra (Aliases: gensflptnl. 8, gensflptnl)

This instruction causes the processor to generate a 16×8 shuffle pattern from the 8×8 shuffle pattern stored in the SIMD register Ra, and to write the generated pattern into the SIMD registers Rb and Rb+1.

According to this instruction, a 16×8 shuffle pattern is generated from an 8×8 shuffle pattern in the SIMD register Ra by shifting the bits of the 8×8 shuffle pattern leftward by one bit, making two copies for each index, and selectively adding 1 or 0 to each index. The input shuffle pattern is an 8×8 pattern and the output shuffle pattern is a 16×8 pattern, and this is similar to the case shown in FIG. 9 where the input shuffle pattern is a 4×8 pattern and the output shuffle pattern is an 8×8 pattern. See FIG. 9 for the details of the input/output shuffle patterns.

In the following [B:A] denotes the bit positions of the $A^{th}$ bit to the $B^{th}$ bit. For example, [63:56] denotes the bit positions of the $56^{th}$ bit to the $63^{th}$ bit. "<<1" denotes a leftward bit shift by one bit.

Rb[63:56]=(Ra[63:56]<<1)+1;
Rb[55:48]=(Ra[63:56]<<1)+0;
Rb[47:40]=(Ra[55:48]<<1)+1;
Rb[39:32]=(Ra[55:48]<<1)+0;
Rb[31:24]=(Ra[47:40]<<1)+1;

Rb[23:16]=(Ra[47:40]<<1)+0;
Rb[15:8]=(Ra[39:32]<<1)+1;
Rb[7:0]=(Ra[39:32]<<1)+0;
Rb+1[63:56]=(Ra[31:24]<<1)+1;
Rb+1[55:48]=(Ra[31:24]<<1)+0;
Rb+1[47:40]=(Ra[23:16]<<1)+1;
Rb+1[39:32]=(Ra[23:16]<<1)+0;
Rb+1[31:24]=(Ra[15:8]<<1)+1;
Rb+1[23:16]=(Ra[15:8]<<1)+0;
Rb+1[15:8]=(Ra[7:0]<<1)+1;
Rb+1[7:0]=(Ra[7:0]<<1)+0;
(Instruction 2) gensflptnl. 16. 16 Rb:Rb+1, Ra (Alias: gensflptnl. 16)

This instruction causes the processor to generate an 8×16 shuffle pattern from the 4×16 shuffle pattern stored in the SIMD register Ra, and to write the generated pattern into the SIMD registers Rb and Rb+1.
Rb[63:48]=(Ra[63:48]<<1)+1;
Rb[47:32]=(Ra[63:48]<<1)+0;
Rb[31:16]=(Ra[47:32]<<1)+1;
Rb[15:0]=(Ra[47:32]<<1)+0;
Rb+1[63:48]=(Ra[31:16]<<1)+1;
Rb+1 [47:32]=(Ra[31:16]<<1)+0;
Rb+1[31:16]=(Ra[15:0]<<1)+1;
Rb+1[15:0]=(Ra[15:0]<<1)+0;
(Instruction 3) gensflptnl. 16. 8 Rb:Rb+1, Ra (Aliases: gensflptnl. 16, gensflptn)

This instruction causes the processor to generate a 16×8 shuffle pattern from the 4×16 shuffle pattern stored in the SIMD register Ra, and to write the generated pattern into the SIMD registers Rb and Rb+1.
Rb[63:56]=(Ra[63:48]<<1)+3;
Rb[55:48]=(Ra[63:48]<<1)+2;
Rb[47:40]=(Ra[63:48]<<1)+1;
Rb[39:32]=(Ra[63:48]<<1)+0;
Rb [31:24]=(Ra[47:32]<<1)+3;
Rb[23:16]=(Ra[47:32]<<1)+2;
Rb[15:8]=(Ra[47:32]<<1)+1;
Rb[7:0]=(Ra[47:32]<<1)+0;
Rb+1[63:56]=(Ra[31:16]<<1)+3;
Rb+1[55:48]=(Ra[31:16]<<1)+2;
Rb+1[47:40]=(Ra[31:16]<<1)+1;
Rb+1[39:32]=(Ra[31:16]<<1)+0;
Rb+1[31:24]=(Ra[15:0]<<1)+3;
Rb+1[23:16]=(Ra[15:0]<<1)+2;
Rb+1[15:8]=(Ra[15:0]<<1)+1;
Rb+1[7:0]=(Ra[15:0]<<1)+0;
(Instruction 4) gensflptn. 16. 8 Rb, Ra This instruction causes the processor to generate an 8×8 shuffle pattern from the 4×16 shuffle pattern stored in the SIMD register Ra, and to write the generated pattern into the SIMD register Rb.
Rb[63:56]=(Ra[63:48]<<1)+1;
Rb[55:48]=(Ra[63:48]<<1)+0;
Rb[47:40]=(Ra[47:32]<<1)+1;
Rb[39:32]=(Ra[47:32]<<1)+0;
Rb[31:24]=(Ra[31:16]<<1)+1;
Rb[23:16]=(Ra[31:16]<<1)+0;
Rb[15:8]=(Ra[15:0]<<1)+1;
Rb[7:0]=(Ra[15:0]<<1)+0;
(Instruction 5) gensflptn. 32. 16 Rb, Ra (Alias: gensflptn. 32)

This instruction causes the processor to generate a 4×16 shuffle pattern from the 2×32 shuffle pattern stored in the SIMD register Ra, and to write the generated pattern into the SIMD register Rb.
Rb[63:48]=(Ra[63:32]<<1)+1;
Rb[47:32]=(Ra[63:32]<<1)+0;
Rb[31:16]=(Ra[31:0]<<1)+1;
Rb[15:0]=(Ra[31:0]<<1)+0;
(Instruction 6) gensflptn. 32. 8 Rb, Ra This instruction causes the processor to generate an 8×8 shuffle pattern from the 2×32 shuffle pattern stored in the SIMD register Ra, and to write the generated pattern into the SIMD register Rb.
Rb[63:56]=(Ra[63:32]<<1)+3;
Rb[55:48]=(Ra[63:32]<<1)+2;
Rb[47:40]=(Ra[63:32]<<1)+1;
Rb[39:32]=(Ra[63:32]<<1)+0;
Rb[31:24]=(Ra[31:0]<<1)+3;
Rb[23:16]=(Ra[31:0]<<1)+2;
Rb[15:8]=(Ra[31:0]<<1)+1;
Rb[7:0]=(Ra[31:0]<<1)+0;
(Instruction 7) gensflptnl. Rc:Rc+1, Ra, Rb This instruction causes the processor to generate a shuffle pattern from the shuffle pattern stored in the Ra according to the value of Rb, and to store the generated pattern into the SIMD registers Rc and Rc+1. This instruction is an IF ELSE code branching according to the value of Rb[1:0]. Note that the processing to be performed varies when Rb[1:0] is not 0, 1 or 2.
if (Rb[1:0]=0)[
Rc[63:56]=(Ra[63:56]<<1)+1;
Rc[55:48]=(Ra[63:56]<<1)+0;
Rc[47:40]=(Ra[55:48]<<1)+1;
Rc[39:32]=(Ra[55:48]<<1)+0;
Rc[31:24]=(Ra[47:40]<<1)+1;
Rc[23:16]=(Ra[47:40]<<1)+0;
Rc[15:8]=(Ra[39:32]<<1)+1;
Rc[7:0]=(Ra[39:32]<<1)+0;
Rc+1 [63:56]=(Ra[31:24]<<1)+1;
Rc+1 [55:48]=(Ra[31:24]<<1)+0;
Rc+1 [47:40]=(Ra[23:16]<<1)+1;
Rc+1 [39:32]=(Ra[23:16]<<1)+0;
Rc+1[31:24]=(Ra[15:8]<<1)+1;
Rc+1[23:16]=(Ra[15:8]<<1)+0;
Rc+1[15:8]=(Ra[7:0]<<1)+1;
Rc+1[7:0]=(Ra[7:0]<<1)+0;
] else if (Rb[1:0]=1)[
Rc[63:48]=(Ra[63:48]<<1)+1;
Rc[47:32]=(Ra[63:48]<<1)+0;
Rc[31:16]=(Ra[47:32]<<1)+1;
Rc[15:0]=(Ra[47:32]<<1)+0;
Rc+1 [63:48]=(Ra[31:16]<<1)+1;
Rc+1 [47:32]=(Ra[31:16]<<1)+0;
Rc+1[31:16]=(Ra[15:0]<<1)+1;
Rc+1[15:0]=(Ra[15:0]<<1)+0;
] else if (Rb[1:0]=2)[
Rc[63:56]=(Ra[63:48]<<1)+3;
Rc[55:48]=(Ra[63:48]<<1)+2;
Rc[47:40]=(Ra[63:48]<<1)+1;
Rc[39:32]=(Ra[63:48]<<1)+0;
Rc[31:24]=(Ra[47:32]<<1)+3;
Rc[23:16]=(Ra[47:32]<<1)+2;
Rc[15:8]=(Ra[47:32]<<1)+1;
Rc[7:0]=(Ra[47:32]<<1)+0;
Rc+1[63:56]=(Ra[31:16]<<1)+3;
Rc+1 [55:48]=(Ra[31:16]<<1)+2;
Rc+1 [47:40]=(Ra[31:16]<<1)+1;
Rc+1 [39:32]=(Ra[31:16]<<1)+0;
Rc+1[31:24]=(Ra[15:0]<<1)+3;
Rc+1[23:16]=(Ra[15:0]<<1)+2;
Rc+1[15:8]=(Ra[15:0]<<1)+1;
Rc+1[7:0]=(Ra[15:0]<<1)+0;
]

Note that the value of Rb and the bit position referred to by Rb described above are only examples, and should not be limited in this way. Although only the cases where the value of the Rb[1:0] is 0, 1 or 2 are described above, other values may be defined. Also, the processing to be performed may not vary when Rb[1:0] is not 0, 1 or 2, and may be fixed (e.g. the same as the case where the value of Rb[1:0] is 0). The same applies to the instruction 8 below.

(Instruction 8) gensflptn Rc, Ra, Rb

The instruction causes the processor to generate a shuffle pattern from the shuffle pattern stored in the Ra according to the value of Rb, and to store the generated pattern into the SIMD register Rc. Note that the processing to be performed varies when Rb[1:0] is not 0, 1 or 2.

if (Rb[1:0]=0)[
Rc[63:56]=(Ra[63:48]<<1)+1;
Rc[55:48]=(Ra[63:48]<<1)+0;
Rc[47:40]=(Ra[47:32]<<1)+1;
Rc[39:32]=(Ra[47:32]<<1)+0;
Rc[31:24]=(Ra[31:16]<<1)+1;
Rc[23:16]=(Ra[31:16]<<1)+0;
Rc[15:8]=(Ra[15:0]<<1)+1;
Rc[7:0]=(Ra[15:0]<<1)+0;
] else if (Rb[1:0]=1)[
Rc[63:48]=(Ra[63:32]<<1)+1;
Rc[47:32]=(Ra[63:32]<<1)+0;
Rc[31:16]=(Ra[31:0]<<1)+1;
Rc[15:0]=(Ra[31:0]<<1)+0;
] else if (Rb[1:0]=2)[
Rc[63:56]=(Ra[63:32]<<1)+3;
Rc[55:48]=(Ra[63:32]<<1)+2;
Rc[47:40]=(Ra[63:32]<<1)+1;
Rc[39:32]=(Ra[63:32]<<1)+0;
Rc [31:24]=(Ra[31:0]<<1)+3;
Rc[23:16]=(Ra[31:0]<<1)+2;
Rc[15:8]=(Ra[31:0]<<1)+1;
Rc[7:0]=(Ra[31:0]<<1)+0;
]

<Supplemental Description 1>

Figure 25:
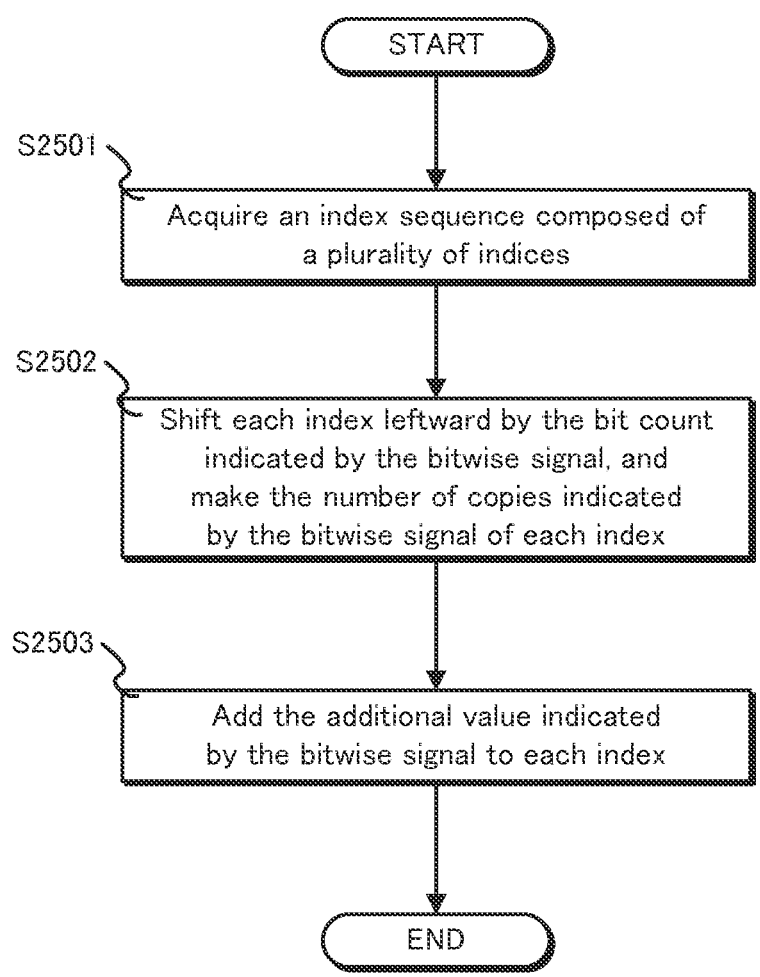
FIG. 25 is a flowchart showing a shuffle pattern generating method.

(1) The shuffle pattern generating circuit pertaining to each embodiment may be embodied as a method of generating a shuffle pattern. FIG. 25 is a flowchart showing a method corresponding to Embodiment 2. This method includes a step of acquiring an index sequence composed of a plurality of indices (S2501), a step of shifting each index leftward by the number of bits indicated by the bitwise signal and making the number of copies indicated by the bitwise signal (S2502), and adding the additional value indicated by the bitwise signal to each index (S2503).

(2) In each embodiment, the input information to the shuffle pattern generating circuit 701 is referred to as "the input shuffle pattern", and the information generated by the shuffle pattern generating circuit 701 is referred to as "the output shuffle pattern". However, in order to clearly distinguish the material (the input) and the product (the output) for the shuffle pattern generating circuit 701, the input information may be referred to as "the index sequence", and the information to be generated may be referred to as simply "the shuffle pattern".

(3) The instruction explained in the description of Embodiments 5 and 6 may be executed by a processor of various kinds of information processing devices or various circuits connected to such a processor.

<Supplemental Description 2>

The present embodiment includes the following aspects.

(1) A shuffle pattern generating circuit pertaining to an embodiment of the present invention comprises: a shift-copier that generates an index sequence by: receiving an input index sequence composed of a plurality of indices, and a signal indicating a number of bits and a number of copies; shifting each index in the input index sequence leftward by the number of bits; and making the number of copies of each index in the input index sequence, and outputs the generated index sequence; and an adder that receives the index sequence output by the shift-copier and a signal indicating an additional value to be added to each index in the index sequence output by the shift-copier, and adds the additional value to each index in the index sequence output by the shift-copier.

(2) The additional value may be different for each copy made from a same index in the input index sequence.

Making the additional value different for each copy made from a same index in the input index sequence contribute to generation of a shuffle pattern without duplication or missing parts.

(3) The number of the copies may be N (where N is an integer equal to or greater than 2), and the additional value to be added to one of the copies made from a same index in the input index sequence may be 0, and the additional value to be added to each of the remaining N−1 copies may be an integer ranging from 1 to N−1.

With this structure, since the additional value to one of the indices is 0, the processing load can be reduced.

(4) The shuffle pattern generating circuit may further comprise a bit width changer that receives a signal indicating a bit width of each index in the input index sequence, and changes a bit width of each index to the bit width indicated by the signal.

With this structure, the shuffle pattern generating circuit is capable of generating a shuffle pattern with an adjusted bit width.

(5) The shift-copier may make the copies of each index after shifting each index leftward, or shift each index leftward after making the copies of each index.

(6) A shuffle pattern generating circuit pertaining to an embodiment comprises: an m×k index table associating m k-bit indices to each of j indices (where m is an integer equal to or greater than 2); an n×l index table associating n l-bit indices to each of j indices (where n is an integer equal to or greater than 2 and different from m); and a referrer that receives a shuffle pattern composed of j indices, and a signal indicating one of the tables, refers to the one of the tables indicated by the signal, and outputs a shuffle pattern composed of j×m or j×n indices.

(7) Another aspect of the present invention is a processor including the shuffle pattern generating circuit described above, comprising: an instruction decoder that decodes an input instruction and generates a control signal according to the instruction; and a register file that provides data to the shuffle pattern generating circuit and stores data provided by the shuffle pattern generating circuit according to the control signal, wherein the signal received by the shuffle pattern generating circuit is the control signal.

(8) A shuffle pattern generating method pertaining to an embodiment comprises: a shift-copier step of generating an index sequence by: receiving an input index sequence composed of a plurality of indices, and a signal indicating a number of bits and a number of copies; shifting each index in the input index sequence leftward by the number of bits; and making the number of copies of each index in the input index sequence, and outputting the generated index sequence; and an adder step of receiving the index sequence output by the shift-copier step and a signal indicating an additional value to be added to each index in the index sequence output by the shift-copier step, and adding the additional value to each index in the index sequence output by the shift-copier step (9) In the shift-copier step, the copies of each index may be made after each index is shifted leftward, or each index may be shifted leftward after the copies of each index are made.

(10) A set of instructions pertaining to an embodiment comprises an instruction to receive an input index sequence composed of a plurality of indices, and control data indicating a number of bits, a number of copies, and an additional value to be added to each index; an instruction to shift each index leftward by the number of bits; an instruction to make the number of copies of each index; and an instruction to add the additional value to each index, and to output each index after the addition.

(11) In (10), the additional value may be different for each copy made from a same index in the input index sequence.

(12) In (11), the number of the copies may be N (where N is an integer equal to or greater than 2), and the additional value to be added to one of the copies made from a same index in the input index sequence may be 0, and the additional value to be added to each of the remaining N−1 copies may be an integer ranging from 1 to N−1.

(13) In (10), the control data may indicate a bit width of each index, and the set of instructions may further comprise: an instruction to change a bit width of each index to the bit width indicated by the control data, and to output each index after changing the bit width.

INDUSTRIAL APPLICABILITY

The shuffle pattern generating circuit pertaining to the present invention is applicable to, for example, an SIMD processor using shuffle pattern generating instructions.

REFERENCE SIGNS LIST

101: shuffle pattern
202, 702, 1502, 1902: input shuffle pattern (index sequence)
203, 703, 1503, 1903: output shuffle pattern
301, 701, 701a, 1411, 1501, 1901, 2205, 2206: shuffle pattern generating circuit
304, 704, 802, 1504, 1904, 2211, 2212: bitwise signal
305, 706, 1506: shifter
306, 1509: bit changer
307, 708, 1408, 1508: adder
401, 402, 403, 404, 601, 602, 901, 902, 1001, 1002, 1101, 1102, 1301, 1302, 1601, 1602, 1603, 1701, 1702, 1703, 1801, 1802, 1803: index sequence
705, 705a, 1405, 1505: shift-copier
707, 1507: copier
1404a: bitwise signal A
1404b: bitwise signal B
1905: 2×8 index table
1906: 4×8 index table
1907: index table referrer
2201: processor
2203: instruction decoder
2204: SIMD register file

The invention claimed is:

1. A shuffle pattern generating circuit comprising:
a shift-copier that generates an index sequence by: receiving an input index sequence composed of a plurality of indices, and a signal indicating a number of bits and a number of copies; shifting each index in the input index sequence leftward by the number of bits; and making the number of copies of each index in the input index sequence, and outputs the generated index sequence; and
an adder that receives the index sequence output by the shift-copier and a signal indicating an additional value to be added to each index in the index sequence output by the shift-copier, and adds the additional value to each index in the index sequence output by the shift-copier.

2. The shuffle pattern generating circuit of claim 1, wherein the additional value is different for each copy made from a same index in the input index sequence.

3. The shuffle pattern generating circuit of claim 2, wherein the number of the copies is N (where N is an integer equal to or greater than 2), and the additional value to be added to one of the copies made from a same index in the input index sequence is 0, and the additional value to be added to each of the remaining N−1 copies is an integer ranging from 1 to N−1.

4. The shuffle pattern generating circuit of claim 1, further comprising:
a bit width changer that receives a signal indicating a bit width of each index in the input index sequence, and changes a bit width of each index to the bit width indicated by the signal.

5. The shuffle pattern generating circuit of claim 1, wherein the shift-copier makes the copies of each index after shifting each index leftward, or shifts each index leftward after making the copies of each index.

6. A processor including the shuffle pattern generating circuit of claim 1, comprising:
an instruction decoder that decodes an input instruction and generates a control signal according to the instruction; and
a register file that provides data to the shuffle pattern generating circuit and stores data provided by the shuffle pattern generating circuit according to the control signal, wherein
the signal received by the shuffle pattern generating circuit is the control signal.

7. A shuffle pattern generating method comprising:
a shift-copier step of generating an index sequence by: receiving an input index sequence composed of a plurality of indices, and a signal indicating a number of bits and a number of copies; shifting each index in the input index sequence leftward by the number of bits; and making the number of copies of each index in the input index sequence, and outputting the generated index sequence; and
an adder step of receiving the index sequence output by the shift-copier step and a signal indicating an additional value to be added to each index in the index sequence output by the shift-copier step, and adding the additional value to each index in the index sequence output by the shift-copier step.

8. The shuffle pattern generating method of claim 7, wherein
in the shift-copier step, the copies of each index are made after each index is shifted leftward, or each index is shifted leftward after the copies of each index are made.

9. An instruction sequence comprising:
an instruction to receive an input index sequence composed of a plurality of indices, and control data indicating a number of bits, a number of copies, and an additional value to be added to each index;
an instruction to shift each index leftward by the number of bits;

an instruction to make the number of copies of each index; and an instruction to add the additional value to each index, and to output each index after the addition.

10. The instruction sequence of claim 9, wherein the additional value is different for each copy made from a same index in the input index sequence.

11. The instruction sequence of claim 10, wherein the number of the copies is N (where N is an integer equal to or greater than 2), and the additional value to be added to one of the copies made from a same index in the input index sequence is 0, and the additional value to be added to each of the remaining N−1 copies is an integer ranging from 1 to N−1.

12. The instruction sequence of claim 9, wherein the control data indicates a bit width of each index, and the set of instructions further comprising:

an instruction to change a bit width of each index to the bit width indicated by the control data, and to output each index after changing the bit width.

* * * * *